US012584845B2

(12) United States Patent
Shaked et al.

(10) Patent No.: US 12,584,845 B2
(45) Date of Patent: Mar. 24, 2026

(54) SYSTEM AND METHOD THEREOF FOR REAL-TIME AUTOMATIC LABEL-FREE HOLOGRAPHY-ACTIVATED SORTING OF CELLS

(71) Applicants: RAMOT AT TEL-AVIV UNIVERSITY LTD., Tel Aviv (IL); FRAUNHOFER-GESELLSCHAFT ZUR FÖRDERUNG DER ANGEWANDTEN FORSCHUNG E. V., Munich (DE)

(72) Inventors: Natan Tzvi Shaked, Mazkeret Batya (IL); Itay Barnea, Petach Tikva (IL); Matan Dudaie, Giv'atayim (IL); Noga Nissim, Ramat-Hasharon (IL); Michael Kirschbaum, Nuthetal (DE); Marten Tobias Gerling, Potsdam (DE)

(73) Assignees: RAMOT AT TEL-AVIV UNIVERSITY LTD., Tel Aviv (IL); FRAUNHOFER-GESELLSCHAFT ZUR FÖRDERUNG DER ANGEWANDTEN FORSCHUNG E. V., Munich (DE)

( * ) Notice: Subject to any disclaimer, the term of this patent is extended or adjusted under 35 U.S.C. 154(b) by 526 days.

(21) Appl. No.: 18/006,205

(22) PCT Filed: Jul. 21, 2021

(86) PCT No.: PCT/IL2021/050887
§ 371 (c)(1),
(2) Date: Jan. 20, 2023

(87) PCT Pub. No.: WO2022/018730
PCT Pub. Date: Jan. 27, 2022

(65) Prior Publication Data
US 2023/0258554 A1      Aug. 17, 2023

Related U.S. Application Data

(60) Provisional application No. 63/054,321, filed on Jul. 21, 2020, provisional application No. 63/054,335, filed on Jul. 21, 2020.

(51) Int. Cl.
*G01N 15/1433* (2024.01)
*B01L 3/00* (2006.01)
(Continued)

(52) U.S. Cl.
CPC .... *G01N 15/1433* (2024.01); *B01L 3/502715* (2013.01); *B01L 3/502761* (2013.01);
(Continued)

(58) Field of Classification Search
CPC ............ G01N 15/1433; G01N 15/147; G01N 15/149; B01L 3/502715; B01L 3/502761;
(Continued)

(56) References Cited

U.S. PATENT DOCUMENTS 8,131,053 B2    3/2012    Ortyn et al.
8,548,219 B2    10/2013   Ortyn et al.
(Continued)

FOREIGN PATENT DOCUMENTS

EP        1984030 B1    5/2013
ES        2420834       8/2013

OTHER PUBLICATIONS

Examiner: Giraldez, Sanchez, J.; European Supplementary Search Report; Application No. EP21847031; Dated Aug. 1, 2024; 3 pages.
(Continued)

*Primary Examiner* — John R Wallace
(74) *Attorney, Agent, or Firm* — Daniel A. Thomson; Emerson Thomson & Bennett

(57) ABSTRACT

The present invention relates to an automatic real-time label-free holography-activated sorting of the cell's tech-
(Continued)

nique. The technique provides high-discriminative power on the level of the individual cell. The technique includes rapid automated cell processing during cell visualization and flow, with high discriminative power on the level of the individual cell. The technique may be useful in detection of cancer and to identify different stages of oncogenesis.

17 Claims, 19 Drawing Sheets

(51) Int. Cl.
| | |
|---|---|
| *G01N 15/14* | (2006.01) |
| *G01N 15/10* | (2006.01) |
| *G01N 15/1434* | (2024.01) |
| *G01N 15/149* | (2024.01) |

(52) U.S. Cl.
CPC .... *G01N 15/147* (2013.01); *B01L 2200/0652* (2013.01); *B01L 2300/0654* (2013.01); *B01L 2300/0864* (2013.01); *B01L 2400/0424* (2013.01); *G01N 2015/1006* (2013.01); *G01N 2015/1454* (2013.01); *G01N 2015/1486* (2013.01); *G01N 15/149* (2024.01)

(58) Field of Classification Search
CPC ..... B01L 2200/0652; B01L 2300/0654; B01L 2300/0864
See application file for complete search history.

(56) References Cited

U.S. PATENT DOCUMENTS

| | | | | |
|---|---|---|---|---|
| 8,885,913 | B2 | 11/2014 | Basiji et al. | |
| 2016/0103118 | A1 | 4/2016 | Teitell et al. | |
| 2019/0085375 | A1* | 3/2019 | McEwen | C12N 5/0645 |
| 2019/0263912 | A1* | 8/2019 | Haber | C07K 16/2833 |
| 2020/0056142 | A1 | 2/2020 | Masaeli et al. | |
| 2020/0116614 | A1 | 4/2020 | Bertini et al. | |
| 2020/0182788 | A1* | 6/2020 | Shaked | G01N 15/1433 |
| 2020/0218882 | A1 | 7/2020 | Li et al. | |

OTHER PUBLICATIONS

Lugnan Alessio et al: "Integrated Dielectric Scatterers for Speeding up Classification of Cell Diffraction Patterns" 2018 20th International Conference on Transparent Optical Networks (ICTON), IEEE, Jul. 1, 2018 (Jul. 1, 2018), pp. 1-4, XP033409280.

Schneider B et al; "Using neural networks for high-speed blood cell classification in a holographic-microscopy flow-cytometry system," Progress in Biomedical Optics and Imaging, SPIE—International Society for Optical Engineering, Bellingham, WA, US, vol. 9328, Mar. 2, 2015 (Mar. 2, 2015), pp. 93281F-93281F, XP060049170.

Natan T Shaked et al; "Label-Free Quantitative 1-17 Imaging of Sperm for In-Vitro Fertilization Using Interferometric Phase Microscopy IVF, IMSI, ICSI, IPM, Holography, Imaging, Sperm," Journal of Fertilization: in Vitro—IVF-Worldwide, Reproductive Medicine, Genetics & Stem Cell Biology, vol. 4, No. 3, Jan. 1, 2016 (Jan. 1, 2016), 6 pages, XP055527113.

Ekaterina Drucker, Israel International Search Report and Written Opinion regarding PCT/IL2021/050887; dated Oct. 31, 2021; 9 pages.

Darina Roitshtain, Lauren Wolbromsky, Evgeny Bal, Hayit Greenspan, Lisa L. Satterwhite, Natan T. Shaked, Quantitative Phase Microscopy Spatial Signatures of Cancer Cells, Cytometry A. 2017;91(5):482-493. Apr. 20, 2017.

Neus Godino, Felix Pfisterer, Tobias Gerling, Christian Guernth-Marschner, Claus Duschl and Michael Kirschbaum, Combining dielectrophoresis and computer vision for precise and fully automated single-cell handling and analysis, Lab Chip. 2019; 19(24):4016-4020. doi:10.1039/c9lc00800d, Nov. 20, 2019.

Jian Zhou, Arutha Kulasinghe, Amanda Bogseth, Ken O'Byrne, Chamindie Punyadeera, Ian Papautsky, Isolation of circulating tumor cells in non-small-cell-lung-cancer patients using a multi-flow microfluidic channel, Microsystems & Nanoengineering, https://doi.org/10.1038/s41378-019-0045-6, Feb. 25, 2019.

M. Habaza, M. Kirschbaum, C. Guernth-Marschner, G. Dardikman, I. Barnea, R. Korenstein, C. Duschl, and N. T. Shaked, Rapid 3D Refractive-Index Imaging of Live Cells in Suspension without Labeling Using Dielectrophoretic Cell Rotation, Adv. Sci. 2017, 4, 1600205.

M. Kirschbaum, M. S. Jaeger, T. Schenkel, T. Breinig, A. Meyerhans, and C. Duschl, T cell activation on a single-cell level in dielectrophoresis-based microfluidic devices, Journal of Chromatography A. 2008, 1202, 83-89.

H. Kim, H. Terazono, Y. Nakamura, K. Sakai A. Hattori, M. Odaka, M. Girault, T. Arao, K. Nishio, Y. Miyagi, and K. Yasuda, Development of On-Chip Multi-Imaging Flow Cytometry for Identification of Imaging Biomarkers of Clustered Circulating Tumor Cells, PLoS One, 2014, 9, e104372.

N. T. Shaked, L. L. Satterwhite, M. T. Rinehart, and A. Wax, Quantitative Analysis of Biological Cells Using Digital Holographic Microscopy, in Holography, Research and Technologies. InTechOpen, 2012, pp. 219.

G. Dardikman, M. Habaza, L. Waller, and N. T. Shaked, Video-rate processing in tomographic phase microscopy of biological cells using CUDA, Opt. Express. 2016, 24, 11839-11854.

Haifler M, Girshovitz P, Band G, Dardikman G, Madjar I, Shaked NT, Interferometric phase microscopy for label-free morphological evaluation of sperm cells. Fertil. Steril. 2015; 104:43-47.

Shaked NT, Satterwhite LL, Bursac N, Wax A., Whole-cell-analysis of live cardiomyocytes using wide-field Interferometric phase microscopy. Biomed. Opt. Express 2010; 1:706-719.

Girshovitz P, Shaked NT., Generalized cell morphological parameters based on interferometric phase microscopy and their application to cell life cycle characterization. Biomed. Opt. Express 2012; 3:1757-1773.

Mirsky S, Barnea I, Shaked N., Label-Free quantitative imaging of sperm for in vitro fertilization using interferometric phase microscopy. J Fertil In Vitro-IVF-Worldwide Reprod Med Genet Stem Cell Biol. 2016;190.

Min J, Yao B, Trendafilova V, Ketelhut S, Kastl L, Greve B, Kemper B., Quantitative phase imaging of cells in a flow cytometry arrangement utilizing Michelson interferometer-based off-axis digital holographic microscopy. J. Biophotonics 2019;12.

Lee KCM, Wang M, Cheah KSE, Chan GCF, So HKH, Wong KKY, Tsia KK., Quantitative Phase Imaging Flow Cytometry for Ultra-Large-Scale Single-Cell Biophysical Phenotyping. Cytom. Part A 2019; 95:510-520.

Zhao Y, Shen X, Zhang M, Yu J, Li J, Wang X, Perchoux J, Moreira R da C, Chen T., Self-Mixing Interferometry-Based Micro Flow Cytometry System for Label-Free Cells Classification. Appl. Sci. 2020; 10:478.

Merola F, Memmolo P, Miccio L, Savoia R, Mugnano M, Fontana A, D'ippolito G, Sardo A, Iolascon A, Gambale A, Ferraro P., Tomographic flow cytometry by digital holography. Light Sci. Appl. 2017;6(4): e16241.

Li Y, Cornelis B, Dusa A, Vanmeerbeeck G, Vercruysse D, Sohn E, Blaszkiewicz K, Prodanov D, Schelkens P, Lagae L., Accurate label-free 3-part leukocyte recognition with single cell lens-free imaging flow cytometry. Comput. Biol. Med. 2018; 96:147-156.

Ugele M, Weniger M, Stanzel M, Bassler M, Krause SW, Friedrich O, Hayden O, Richter L., Label-Free High-Throughput Leukemia Detection by Holographic Microscopy. Adv. Sci. 2018; 5:1800761.

Göröcs Z, Tamamitsu M, Bianco V, Wolf P, Roy S, Shindo K, Yanny K, Wu Y, Koydemir HC, Rivenson Y, Ozcan A., A deep learning-enabled portable imaging flow cytometer for cost-effective, high-throughput, and label-free analysis of natural water samples. Light Sci. Appl. 2018; 7:1-12.

Chen CL, Mahjoubfar A, Tai LC, Blaby IK, Huang A, Niazi KR, Jalali B., Deep Learning in Label-free Cell Classification. Sci. Rep. 2016; 6:1-16.

(56) References Cited

OTHER PUBLICATIONS

Girshovitz P, Shaked NT., Fast phase processing in off-axis holography using multiplexing with complex encoding and live-cell fluctuation map calculation in real-time. Opt. Express 2015; 23:8773-8787.

Yevick A, Hannel M, Grier DG., Machine-learning approach to holographic particle characterization. Opt. Express 2014; 22:26884-26890.

Girshovitz P, Shaked NT., Real-time quantitative phase reconstruction in off-axis digital holography using multiplexing. Opt. Lett. 2014; 39:2262-2265.

Backoach O, Kariv S, Girshovitz P, Shaked NT., Fast phase processing in off-axis holography by CUDA including parallel phase unwrapping. Opt. Express 2016; 24:3177-3188.

Mirsky SK, Shaked NT., First experimental realization of six-pack holography and its application to dynamic synthetic aperture super-resolution. Label-free Biomedical Imaging and Sensing Conference SPIE 2020; 11251:59.

Jaye DL, Bray RA, Gebel HM, Harris WAC, Waller EK., Translational Applications of Flow Cytometry in Clinical Practice. J. Immunol. 2012; 188:4715-4719.

* cited by examiner

1

SYSTEM AND METHOD THEREOF FOR REAL-TIME AUTOMATIC LABEL-FREE HOLOGRAPHY-ACTIVATED SORTING OF CELLS

TECHNOLOGICAL FIELD

The present invention relates to a technique for holographic imaging and sorting of cells.

BACKGROUND ART

References considered to be relevant as background to the presently disclosed subject matter are listed below:

1. U.S. Pat. No. 8,885,913
2. U.S. Pat. No. 8,131,053
3. U.S. Pat. No. 8,548,219
4. ES 2,420,834
5. Darina Roitshtain, Lauren Wolbromsky, Evgeny Bal, Hayit Greenspan, Lisa L. Satterwhite, Natan T. Shaked, Quantitative Phase Microscopy Spatial Signatures of Cancer Cells, Cytometry A. 2017; 91(5):482-493. 20 Apr. 2017
6. Neus Godino, Felix Pfisterer, Tobias Gerling, Christian Guernth-Marschner, Claus Duschl and Michael Kirschbaum, Combining dielectrophoresis and computer vision for precise and fully automated single-cell handling and analysis, Lab Chip. 2019; 19(24):4016-4020. doi:10.1039/c91c00800d, 20 Nov. 2019
7. Jian Zhou, Arutha Kulasinghe, Amanda Bogseth, Ken O'Byrne, Chamindie Punyadeera, Ian Papautsky, Isolation of circulating tumor cells in non-small-cell-lung-cancer patients using a multi-flow microfluidic channel, Microsystems & Nanoengineering, https://doi.org/10.1038/s41378-019-0045-6, 25 Feb. 2019.
8. M. Habaza, M. Kirschbaum, C. Guernth-Marschner, G. Dardikman, I. Barnea, R. Korenstein, C. Duschl, and N. T. Shaked, Adv. Sci. 2017, 4, 1600205.
9. M. Kirschbaum, M. S. Jaeger, T. Schenkel, T. Breinig, A. Meyerhans, and C. Duschl, Journal of Chromatography A. 2008, 1202, 83-89.
10. H. Kim, H. Terazono, Y. Nakamura, K. Sakai A. Hattori, M. Odaka, M. Girault, T. Arao, K. Nishio, Y. Miyagi, and K. Yasuda, PLoS One, 2014, 9, e104372.
11. N. T. Shaked, L. L. Satterwhite, M. T. Rinehart, and A. Wax, in Holography, Research and Technologies. InTechOpen, 2012, pp. 219
12. G. Dardikman, M. Habaza, L. Waller, and N. T. Shaked, Opt. Express. 2016, 24, 11839-11854
13. Haifler M, Girshovitz P, Band G, Dardikman G, Madjar I, Shaked N T. Interferometric phase microscopy for label-free morphological evaluation of sperm cells. Fertil. Steril. 2015; 104:43-47.
14. Shaked N T, Satterwhite L L, Bursac N, Wax A. Whole-cell-analysis of live cardiomyocytes using wide-field interferometric phase microscopy. Biomed. Opt. Express 2010; 1:706-719.
15. Girshovitz P, Shaked N T. Generalized cell morphological parameters based on interferometric phase microscopy and their application to cell life cycle characterization. Biomed. Opt. Express 2012; 3:1757-1773.
16. Mirsky S, Barnea I, Shaked N. Label-Free quantitative imaging of sperm for in vitro fertilization using interferometric phase microscopy. J Fertil In Vitro-IVF-Worldwide Reprod Med Genet Stem Cell Biol. 2016; 190.

17. Min J, Yao B, Trendafilova V, Ketelhut S, Kastl L, Greve B, Kemper B. Quantitative phase imaging of cells in a flow cytometry arrangement utilizing Michelson interferometer-based off-axis digital holographic microscopy. J. Biophotonics 2019; 12.
18. Lee K C M, Wang M, Cheah K S E, Chan G C F, So H K H, Wong K K Y, Tsia K K. Quantitative Phase Imaging Flow Cytometry for Ultra-Large-Scale Single-Cell Biophysical Phenotyping. Cytom. Part A 2019; 95:510-520.
19. Zhao Y, Shen X, Zhang M, Yu J, Li J, Wang X, Perchoux J, Moreira R da C, Chen T. Self-Mixing Interferometry-Based Micro Flow Cytometry System for Label-Free Cells Classification. Appl. Sci. 2020; 10:478.
20. Merola F, Memmolo P, Miccio L, Savoia R, Mugnano M, Fontana A, D'ippolito G, Sardo A, Iolascon A, Gambale A, Ferraro P. Tomographic flow cytometry by digital holography. Light Sci. Appl. 2017; 6(4): e16241.
21. Li Y, Cornelis B, Dusa A, Vanmeerbeeck G, Vercruysse D, Sohn E, Blaszkiewicz K, Prodanov D, Schelkens P, Lagae L. Accurate label-free 3-part leukocyte recognition with single cell lens-free imaging flow cytometry. Comput. Biol. Med. 2018; 96:147-156.
22. Ugele M, Weniger M, Stanzel M, Bassler M, Krause SW, Friedrich O, Hayden O, Richter L. Label-Free High-Throughput Leukemia Detection by Holographic Microscopy. Adv. Sci. 2018; 5:1800761.
23. Göröcs Z, Tamamitsu M, Bianco V, Wolf P, Roy S, Shindo K, Yanny K, Wu Y, Koydemir H C, Rivenson Y, Ozcan A. A deep learning-enabled portable imaging flow cytometer for cost-effective, high-throughput, and label-free analysis of natural water samples. Light Sci. Appl. 2018; 7:1-12.
24. Chen CL, Mahjoubfar A, Tai L C, Blaby I K, Huang A, Niazi K R, Jalali B. Deep Learning in Label-free Cell Classification. Sci. Rep. 2016; 6:1-16.
25. Girshovitz P, Shaked N T. Fast phase processing in off-axis holography using multiplexing with complex encoding and live-cell fluctuation map calculation in real-time. Opt. Express 2015; 23:8773-8787.
26. Yevick A, Hannel M, Grier D G. Machine-learning approach to holographic particle characterization. Opt. Express 2014; 22:26884-26890.
27. Girshovitz P, Shaked N T. Real-time quantitative phase reconstruction in off-axis digital holography using multiplexing. Opt. Lett. 2014; 39:2262-2265.
28. Backoach O, Kariv S, Girshovitz P, Shaked N T. Fast phase processing in off-axis holography by CUDA including parallel phase unwrapping. Opt. Express 2016; 24:3177-3188.
29. Mirsky S K, Shaked N T. Six-pack holography and dynamic synthetic aperture superresolution. Label-free Biomedical Imaging and Sensing Conference SPIE 2020; 11251:59.
30. Jaye D L, Bray R A, Gebel H M, Harris W A C, Waller E K. Translational Applications of Flow Cytometry in Clinical Practice. J. Immunol. 2012; 188:4715-4719.

Acknowledgement of the above references herein is not to be inferred as meaning that these are in any way relevant to the patentability of the presently disclosed subject matter.

BACKGROUND

Personalized medicine in cancer research is a concept by which different treatments have different impact on cancer patients with tumors that present different genetic profile.

The traditional way to evaluate the genetic profile of a given tumor is by performing a surgical biopsy. A biopsy is usually performed shortly after the discovery of the disease. However, it is well known that tumors tend to undergo mutations to make them more resistant the treatment. Thus, the genetic profile of tumors obtained in the beginning of treatment is no longer relevant in later stages. After the first line chemotherapy is no longer effective, the oncologist is required to evaluate the therapeutically potential of other treatments. However, at this stage, the genetic profile obtained in the first biopsy is no longer relevant. The options at this stage are either to perform a second surgical biopsy (which is very risky in advanced cancer patients) or to perform a "blood biopsy" i.e. to examine the tumor from a blood sample. There are two ways to perform "blood biopsy": the first is to detect for circulating tumor DNA (ctDNA) usually composed short DNA fragments. ctDNA is isolated from the plasma. It includes DNA from dead cancer cells as well as from normal cells that died because of the disease or the treatment. The second option is to isolate Circulating Tumor Cells (CTC)s from the blood circulation, there are two methods to do so: to use filtration or to use magnetic beads and antibodies. Both methods can enrich the percentage of CTCs but not to filter the CTCs completely from other cells in the blood. The disadvantage in using tumor DNA (ctDNA or from CTCs) is the fact these cells are contaminated with DNA from normal cells, causing a high probability to receive false results regarding the mutations in the tumor, but instead, to receive the genetic profile of the patient.

Circulating tumor cells (CTCs) are cells that detach from a primary tumor, and travel in the peripheral blood system or lymphatics system and can cause metastasis. Finding those cells is of utmost importance for diagnosis, prognosis, and treatment tailoring or adjustment. CTCs can be used as a biomarker to evaluate the metastasis stage or tumor growth progression. The identification of circulating tumor cells (CTCs) in liquid biopsies has major prospective importance in diagnostic assessments and personalized therapeutic treatments of cancer. CTCs are highly specialized cells that may appear in small numbers in the blood stream and originate from both primary and metastatic lesions. Therefore, CTCs can be potentially acquired from liquid biopsies, such as blood tests taken in simple routine lab procedures. Characterization of these rare, disease-associated cells can significantly contribute to cancer detection and the evaluation of cancer progression, as well as provide clinical information on the chosen therapy effectiveness. Detecting and sorting those cells are hard to achieve and are notable technological challenges, since the abundance of CTCs in the blood is approximately one in billions of cells or one in a million nucleated cells. A major challenge, therefore, is to detect and purify CTCs in liquid biopsies in general and in blood in particular.

Leading methods for CTCs filtration are based on physical or biological techniques. Physical filtration based on size can purify CTCs up to one in a thousand, or cluster the CTCs on a chip for identification. These methods allow a rough molecular characterization, but for full, accurate profiling, a higher purity is needed. Biological filtration is based on attaching specific antibodies for immunomagnetic and fluorescence sorting. Commercial filtration kits, such as Screen-Cell¬ or CellSearch, are in use for profiling or enrichment of liquid biopsy samples.

To discriminate a large number of cells into its comprising populations, flow cytometry can be used. Most approaches dealing with the identification of specific cell types rely on using unique antigens or contrast agents. Specifically, in fluorescence-activated cell sorting (FACS), cells are labeled with fluorescent markers for obtaining molecular specificity. Attachment of fluorescent markers to antibodies that recognize target features in the cell is necessary for the unequivocal identification. In the fluorescence-activated cell sorting (FACS), cells are focused during flow between a light source and a detector. The detector counts and classifies the cells by measuring the excited fluorescence light emitted from the cells. Labeling the cells fluorescently or by other antibodies technique (e.g., by magnetic particles), can pose difficulties in post-analysis, since the attachment of biomarkers can have cytotoxic effects on the cells and damage the validity of the measurements. The problem is that certain cell types lack these essential antibodies. Furthermore, the attachment of markers to the cell membrane can cause unwanted chemical interactions that might change the cell characteristics and, as a result, damage the validity of the measurement. Also, in some cases, CTCs do not express the right markers necessary for labeling. Commercial flow cytometers can process 50,000 cells per second and above. Sorting at the end of the FACS can be accomplished by magnetic means, size strainers, and electric or acoustic fields.

In contrast to FACS that detect collective light scattering, imaging flow cytometers use a camera detector to obtain much higher information contents in the form of the cell images, but also have a much lower throughput to avoid smeared images, and thus can typically work at rates of up to thousands of cells per second.

Dielectrophoresis, or DEP, is a phenomenon in which a force is exerted on a dielectric particle when subjecting it to a non-uniform electric field. By changing the voltage between two or more electrodes, i.e., changing the electrical field, one can control the location and orientation of uncharged particles, including biological cells. In DEP, neutral but polarizable particles (i.e., biological cells) are being continuously polarized by the changing electric field, generating torque on the cells, and moving them according to the electric field. DEP can be either positive or negative, where negative means that the electric field between the electrodes repels the particle, and vice-versa. This method is implemented for numerous applications, such as measuring electric properties of cells, as well as manipulating cells for obtaining tomographic phase microscopy [8], cell sorting, and others.

Label-based cytometers are in common use, and in many cases, liquid biopsies undergo enrichment by FACS or other biological labeling methods. However, this is typically done in low efficiency. Specifically, it was shown that FACS was able to get an efficiency of 20%, which is mainly attributed to the losses in handling the cells. Another label-based method is based on attaching polarized antibodies to the CTCs to enable sorting using DEP forces. Using this method, it was possible to recover ~95% of the labeled cells at the rate of 10,000 cells per second flowing in 300 $\mu$l hr$^{-1}$.

To avoid possible cytotoxic effects on the cells and ease the cell preparation process, many research groups have developed label-free methods for cell filtration. Most techniques include differentiation by size. A separation method using light-activated DEP electrodes achieved a recovery rate of approximately 70% with a flow rate of 6 $\mu$l hr$^{-1}$ based on the CTCs size and electric properties. Another group had successfully fabricated a DEP sorting device based on the electric properties; their recovery rate for the CTCs was near 70% as well. An ultra-fast circular separator based on the size of the CTCs was created, with a flow rate of about 36,000 $\mu$l hr$^{-1}$ and recovery rate≥85%.

Stain-free measurement methods for the identification of different cell types overcome these problems by enabling non-invasive measurements of the cell based on the cell intrinsic properties, without using exogenous contrast agents. The refractive index (RI) of the cell is an intrinsic optical parameter that describes how fast light travels through the cell. The RI is correlated with other cell biophysical properties, including mechanical and electrical cell parameters. It represents the intracellular dry mass and concentration of the cell, and also provides valuable information about the inherent morphological organization. Various optical techniques can measure the cell RI non-invasively. One of these methods is interferometric phase microscopy (IPM). IPM, also called digital holographic microscopy and quantitative phase microscopy, measures the quantitative phase profile of the cell. This profile is proportional to the optical path delay (OPD) profile of the cell, which is equal to the product of the cell physical thickness and the difference between the integral refractive indices of the cell and the surrounding media. By acquiring the OPD profile, IPM enables visualizing cells and part of the inner cell organelles without the use of exogenous contrast agents, such as fluorescent markers, as well as classification of cells [13-16].

Although conventional flow cytometry provides an extremely high throughput of up to 100,000 cells per second, it typically only provides a single value per fluorescence marker per cell Imaging flow cytometry (IFC) has become a resurgence of interest due to its high-throughput and multi-parametric analysis at the single-cell level, which is based on the fact that image of the cell is captured during its flow. Typically, IFC uses exogenous contrast agents as well for morphological cell evaluation. However, in the past few years, there have been many advances in the development of label-free IFC for the analysis of cellular populations based on individual cell images. This includes the analysis of cancer cells, blood cell, cell cycle, cell differentiation and drug response.

The combination of holography with IFC provides a label-free imaging technique, for cell analysis and classification during cell flow. Some studies used holographic IFC to measure the characteristics of different types of cancerous cells; Min et al. integrated a digital holographic microscopy system with a conventional flow cytometer to analyze two types of pancreatic tumor cells [17]. Lee et al. reported high-throughput IFC by combining a quantitative phase imaging platform with time-stretch optical microscopy for the classification of human leukemic cell types [18]. In addition, Zhao et al. presented an optical microfluidic cytometry scheme for label-free detection of cells, which is based on self-mixing interferometry technique [19]. Merola et al. demonstrated that by exploiting the rolling of cells while they flow along a microfluidic channel, it is possible to obtain single-cell interferometric tomography for red blood cells [20]. Various studies combined label-free IFC with machine-learning algorithms Li et al. developed a lens-free flow cytometer based on holography for analysis of single leukocytes [21]. Ugele et al. reported a holographic flow cytometry method for label-free differentiation of leukocytes [22]. In particular, deep learning was used for classification; Göröcs et al. investigated objects inside a continuously flowing water sample by holographic flow cytometer [23]. Chen et al. showed that high-throughput label-free classification of T-cells (one type of white blood cells) against colon cancer cells can be achieved through a combination of time-stretch microscopy and deep learning [24].

GENERAL DESCRIPTION

Circulation Tumor Cells (CTC)s are an important class of cells because they represent the tumor cells, but they can be analyzed without the need for surgical biopsy. These cells can be used for different medical needs. Presently, as described above, CTCs can only be enriched using magnetic selection or size filtration.

According to a broad aspect of the present invention, there is provided a system comprising: a holographic imaging module being configured and operable to image a flow of heterogeneous population of cell; a cell sorting module being configured and operable to sort the flow of cells; and a control unit being configured and operable to receive from the holographic imaging module image data being indicative of the flow of cells; automatically process the image data and identify a certain type of cells during the flow and upon identification of a certain type of cells activating the cell sorting module to enable real-time, automatic, label-free holography-activated sorting of the cells.

In some embodiments, the control unit is configured and operable to process digital holograms of the cells dynamically and classify the cells during the flow and/or to classify the cells by using machine learning and/or to calculate an OPD map using a database and extract a plurality of features based on the image phase and amplitude.

In some embodiments, the cell sorting microfluidic module is placed inside the holographic imaging module such that the cell sorting module is viewed through the holographic imaging module.

In some embodiments, the holographic imaging module comprises a high- or low-coherence off-axis interferometric phase microscope and a microfluidic channel to quantitatively image cells during flow.

In some embodiments, the system further comprises at least one container for collecting sorted-out cells.

In some embodiments, the system further comprises a plurality of microfluidics pumps. At least one microfluidics pump of the plurality of microfluidics pumps may be configured and operable to direct the sorted-out cells towards the at least one container.

According to a broad aspect of the present invention, there is provided a method comprising: performing a holographic imaging of a flow of a heterogeneous population of cells to enable label-free quantitative imaging of the flow of cells; automatically processing image data of the holographic imaging to identify a certain type of cells during the flow; and automatically sorting the certain type of cells during flow, thereby obtaining a real-time, automatic, label-free holography-activated sorting of the cells.

In some embodiments, performing a holographic imaging of the flow of cells comprises performing a digital holographic microscopy and quantitative phase microscopy to measure the quantitative phase profile of the cell being indicative of the optical path delay (OPD) profile of the cell to enable label-free interferometric phase microscopy.

Automatically processing image data may comprise reconstructing the OPD map for each cell individually and/or extracting from each OPD 2D and 3D morphological and quantitative features and/or performing classification based on 2D and 3D morphological quantitative features of the cells during the cell flow and/or performing a real-time classification of each cell.

In some embodiments, classifying the cells comprises performing machine learning. Automatically processing image data may comprise performing a sequence of classification, wherein each classification is capable of identifying different types of cells and/or performing classification of unlabeled cancer cells in blood to enable label-free imaging and sorting of cancer cells in blood.

In some embodiments, the method further comprises automatically classifying primary and metastatic cancer cells.

In some embodiments, performing a holographic imaging of the flow of cells comprises acquiring at least one single-cell hologram during flow and/or obtaining a plurality of off-axis holograms and performing a quantitative phase reconstruction process.

In some embodiments, automatically sorting the certain type of cells comprises isolating at least one certain type of cells from other cells in the flow and/or automatically sorting the certain type of cells during or following cell visualization.

In some embodiments, the technique of the present invention enables to provide a better isolation of rare cells such as CTCs from other cells in the blood stream to improve their medical use. The invention provides a second stage for the enrichment of CTCs (the first stage is either filtration by size or magnetic (i.e. antibody isolation means) to enable complete isolation of CTCs by using a phase based selection and sorting of rare clinically relevant cells (Phase RACE) method. The rare cell type is enriched and then the enriched cells are inserted into a sorting system. The cells are imaged and analyzed, and if a cell is found to be a cell of interest, the cell is diverted and isolated in a poll to rare cells. For example, serial time-encoded amplified imaging may be used for studying dynamical events such as chemical dynamics in living cells and microfluidics. The isolated cells can be used for genetic or morphological characterization of themselves or of other elements in the cells, as well as for diagnosis for the presents for these cells. The test results of the genetic or morphological characterization can be used to determine an optimal treatment for a specific patient.

In some embodiments, the method further comprises analyzing the genetic metabolic profile to enable at least one of a diagnosis or an optimization of a treatment of the patient.

The technique thus provides a label-free imaging and sorting of circulating cancer cells in blood, which is based on a cell sorting module and label-free interferometric phase microscopy. The use of a label-free imaging technique enables sorting in real-time the cells based on the decisions obtained during the cell flow by the label-free quantitative imaging method of the present invention.

The cell sorting module may be implemented by using any commercially available cell sorting module, based on pulsed pump, laminar flow, acoustic, electric, or magnetic field or dielectrophoresis. In a specific and non-limiting example a dielectrophoretic microfluidic module embedded with dielectrophoretic electrodes may be used. The cell sorting module may comprise a dielectrophoretic microfluidic module including an array of spaced-apart electrodes, when activating the dielectrophoretic microfluidic module comprises operating at least one electrode by alternatively switching on or off one or more relevant electrodes to direct the cells of interest. The array of spaced-apart electrodes may be positioned on both sides of the dielectrophoretic microfluidic module to define a sorting trajectory for the flow of cells along the dielectrophoretic microfluidic module. At least one electrode of the plurality of electrodes may be configured and operable to at least one of the following: center and direct the cells along the sorting trajectory into an imaging field of view and a holographic region of interest, push the cells to either side of the dielectrophoretic microfluidic module, increase the distance between cell streams.

A real-time, automatic, label-free imaging flow cytometry has been obtained with the ability to sort the cells during flow. Above 98% classification success and 69% sorting accuracy were obtained at flow rates of 4-7 $\mu$l hr$^{-1}$. The technique of the present invention is non-invasive and can sort in real-time individual cells. It can be used for the detection and monitoring of cancer and metastasis and in identifying different stages of oncogenesis by using liquid biopsies obtained in routine blood tests.

In some embodiments, the technique provides a label-free imaging holography-activated for cancer-cell sorting from blood cells in a DEP microfluidic module based on real-time classification of intact cancer cells from blood cells, by using digital holographic microscopy and machine learning.

Unlike the filtration method which is based on the filtration of cells according to their size, and unlike the negative magnetic beads conventional method which is based on the capturing of blood cells by antibodies (while CTCs are not depleted), in the technique of the present invention only CTCs are expected to be present in the output CTCs reservoir. It should be noted that typically, when conventional filtration methods are used, for each CTC filtered there are thousands of non-cancerous cells. Moreover, in the positive magnetic beads' conventional method, which is based on the capturing of cells, usually metastasis cancer cells, that express Epithelial cell adhesion molecule (EpCAM) by antibodies (while blood cells are not depleted), the vitality of the cells is not preserved and the normal cells in blood stream (such as fibroblasts or endothelial cells) and CTCs are not discriminated.

In some embodiments, the method further comprises counting cells. Therefore, the invention enables the counting of rare cells in the body fluids. For example, by numeration of the number of CTCs in a blood sample, the stage and prognosis of the malignant disease can be predicted.

In some embodiments, the method further comprises identifying in the certain type of cells at least one of DNA, RNA, protein or any other metabolite to provide a genetic metabolic profile of a patient. As described above, the invention also enables the isolation of distinct groups of cells from body fluids, such as the isolation of CTCs from a blood sample. These cells can later be used for the sequencing of their DNA or mRNA or siRNA. The stored cells can be used for examining the DNA or RNA or protein or any other metabolite. This examination can reflect genetic/transcriptomic/proteomic/metabolic profile of the patient. The results obtained can be used to diagnose and to optimize treatment for individuals with suspected or diagnosed medical conditions. These sequences can be used to personalize the treatment of a particular patient. For example, the medication Osimertinib (Tagrisso) is effective in patients with non-small cells lung cancer (NSCLC) that present the mutation T790M in the EGFR gene.

Therefore, there is provided a new technique for label-free analysis and sorting of cancer cells in blood. The method is based on interferometric phase microscopy (IPM), real-time classification, and sorting. In this connection, it should be noted that, due to the capability of the imaging module of the present invention to provide 2D morphological features and 3D quantitative features of the cells, the technique of the present invention is particularly useful to be used for sorting of cancer cells in blood because of the low concentration of the cancer cells in blood. The identification of the 2D morphological features and 3D quantitative features of the cells enables to determine the stage of the cancer and to sort the different types of cells. A high purity sample of CTCs can be obtained by using the technique of the present invention from progressive stage cancer patients. For this, the liquid biopsy taken from a cancer patient is first filtered, leaving almost only the larger cells, i.e., white blood cells and CTCs. This filtration results in CTC concentration increase, from $1:10^9$ to $1:10^4$.

The sorting system of the present invention is capable of receiving this enriched sample and detects and sorts in real-time (during flow) the cancer cells based on their label-free quantitative-imaging properties. By flowing an enriched liquid biopsy through the cell sorting module, recording and processing the digital holograms of the cells dynamically, the cells were classified during flow (e.g. using machine learning), and then a cell sorting module is activated for sorting the cancer cells. All the components of the sorting system of the present invention may be placed in a one portable box, ready for use in the clinical setting. As mentioned above, early detection of cancer greatly increases the chances of successful treatment and survival. Most diagnostic techniques based on liquid biopsies rely on analyzing the cells after antibodies attachment to specific tumor antigens, which might affect the cell behavior. In one aspect of the present invention, cancer cells may be distinguished from blood cells, and primary cancer cells from metastatic cancer cells, without using external labeling during cell flow. Therefore, an automatic real-time stain-free non-invasive classification technique of different types of cancerous cells from different types of blood cells using label-free holographic flow cytometry is provided. The technique may be useful in detection of cancer and to identify different stages of oncogenesis. The technique provides high-discriminative power on the level of the individual cell. The technique provides stain-free quantitative phase microscopy for the identification and classification of live and unattached cancerous cells inside a blood sample. The technique includes rapid automated cell processing during cell visualization and flow, with high discriminative power on the level of the individual cell.

In some embodiments, there is provided a technique for a real-time visualization and automatic processing for detection and classification of unlabeled cancer cells in blood during stain-free imaging flow cytometry using digital holographic microscopy and machine learning (e.g. in throughput of 15 cells per second). By automating the processes of image acquisition and cell identification, the technique of the present invention enables higher system throughputs than conventional methods. The inventors have automatically classified primary and metastatic colon cancer cells, where the two types of cancer cells were isolated from the same individual, as well as four types of blood cells. In a specific and non-limiting example, low-coherence off-axis interferometric phase microscopy and a microfluidic channel were used to quantitatively image cells during flow. The acquired images were processed and classified based on their morphology and quantitative phase features during the cell flow. High accuracy of 92.56% was achieved for distinguishing between the cells.

The sorting system of the present invention can acquire single-cell holograms during flow and analyze them in real-time by applying image processing and machine learning (e.g. machine-learning techniques including PCA-based cell type representation). For training the classifiers, off-axis holograms of each cell type were acquired in advance separately using IPM and the associated OPD profiles were extracted. Then, a database for training a machine-learning classifier based on support vector machine (SVM) was created and features that differentiated cancerous cells from a heterogeneous blood sample were identified. This SVM model was then used for real-time classification of heterogeneous population of cells during flow. For example, several types of classification models may be created, such as one-step SVM or multiple steps SVM. The processing time may be speed up by using holographic compression as described for example in [26].

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
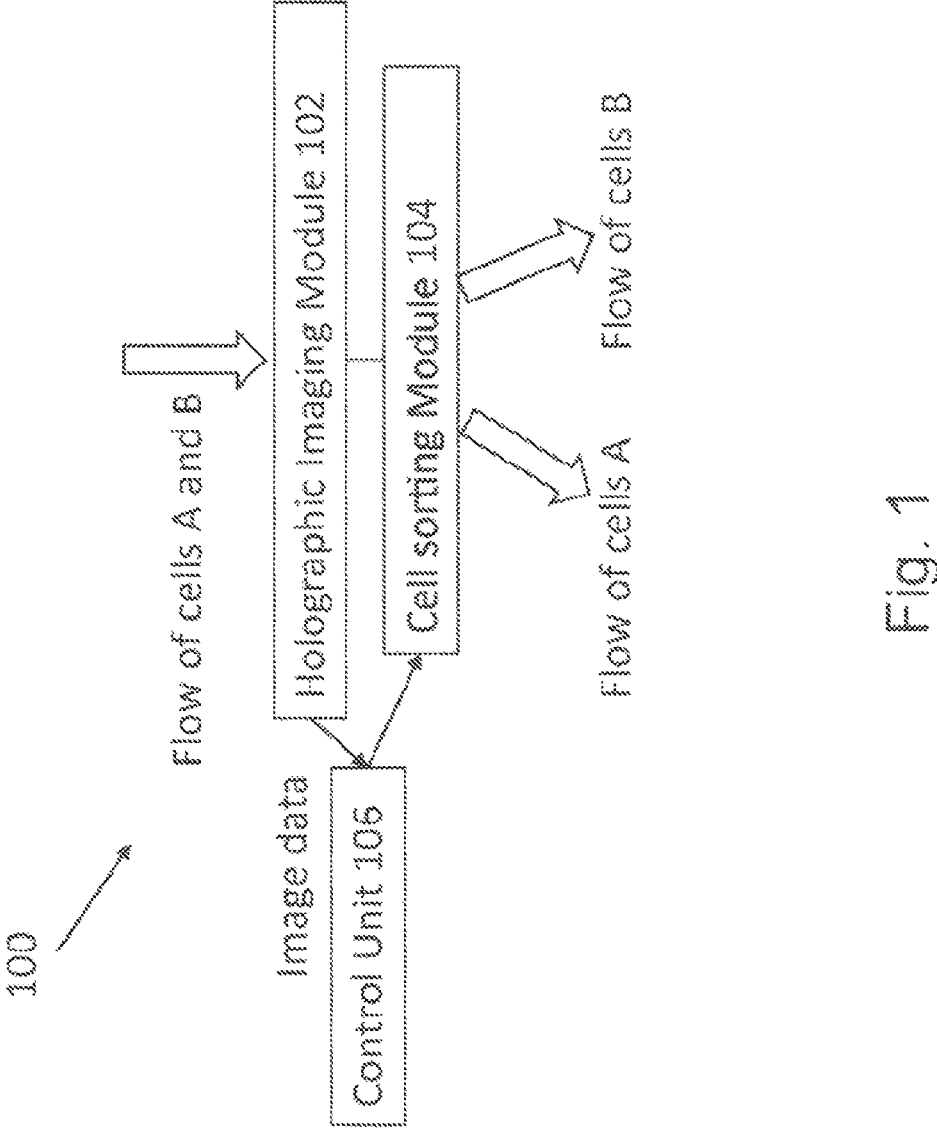
FIG. 1 is a block diagram schematically illustrating the main functional elements of the sorting system of the present invention.

FIG. 1 is a flow chart schematically illustrating the main functional elements of the sorting system 100 of the present invention. Sorting system 100 comprises a holographic imaging module 102 being configured and operable to image a flow of heterogeneous population of cell (for example of cells A and B); a cell sorting module 104 being configured and operable to sort the flow of cells; and a control unit 106 being configured and operable to receive from the holographic imaging module image data being indicative of the flow of cells; automatically process the image data and identify a certain type of cells during the flow and upon identification of a certain type of cells activating cell sorting module 104 to enable real-time, automatic, label-free holography-activated sorting of the cells. Holographic imaging module 102 and cell sorting module 104 are connected to control unit 106 by wire or wireless communication. Cell sorting module 104 may be implemented by any cell sorting module such as a DEP microfluidic chip being for example embedded with dielectrophoretic electrodes. Holographic imaging module 102 may be implemented by an interferometric phase microscopy.

Figure 2:
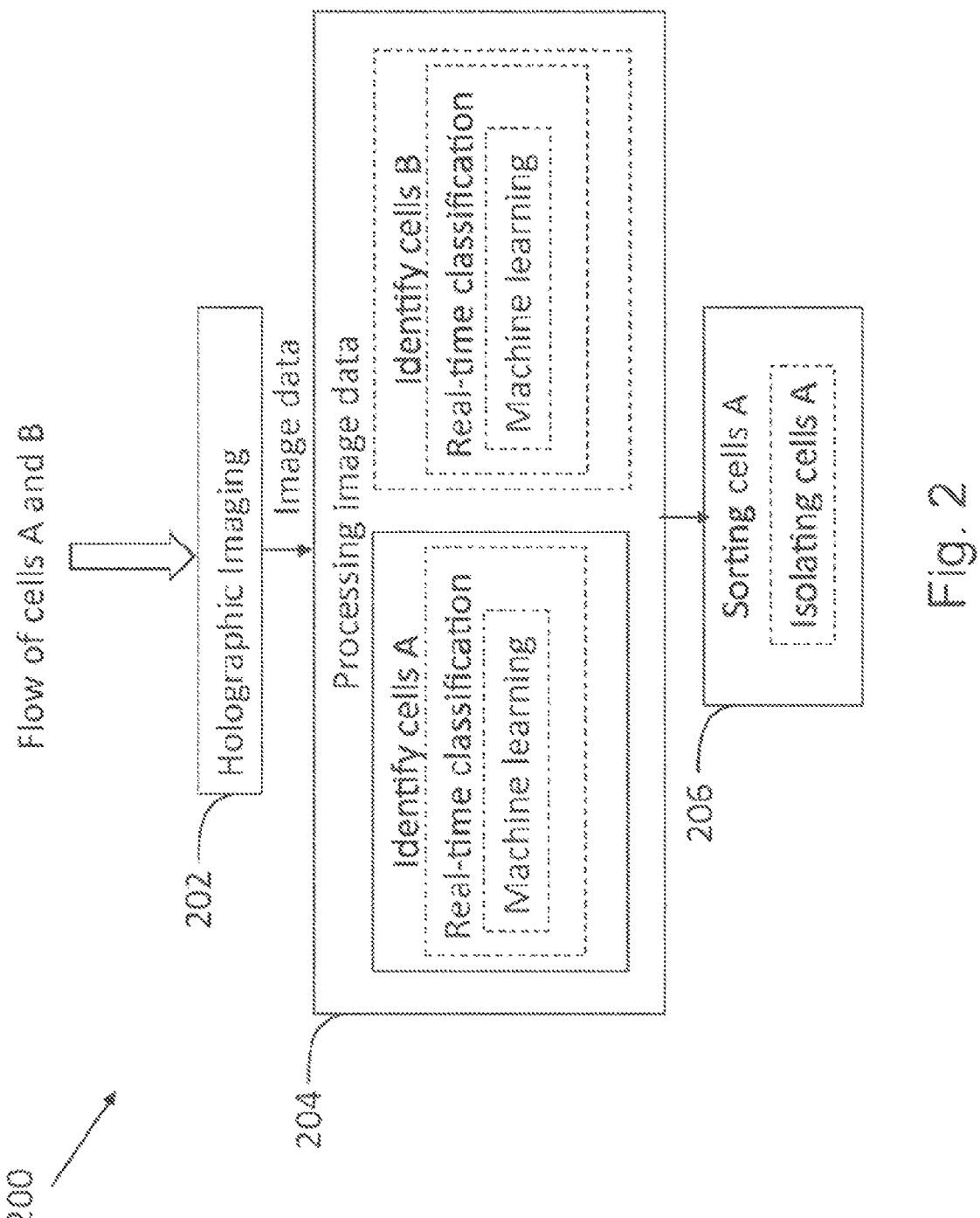
FIG. 2 is a flow chart schematically illustrating the main functional steps of the method for real-time, automatic, label-free holography-activated sorting of the cells according to some embodiments of the present invention.

FIG. 2 is a flow chart schematically illustrating the main functional steps of the method 200 for real-time, automatic, label-free holography-activated sorting of the cells according to some embodiments of the present invention. Method 200 comprises performing a holographic imaging of a flow of a heterogeneous population of cells in 202 to enable label-free quantitative imaging of the flow of cells; automatically processing image data of the holographic imaging in 204 to identify a certain type of cells during the flow; and automatically sorting the certain type of cells in 206, thereby obtaining a real-time, automatic, label-free holography-activated sorting of the cells. Automatically processing image data in 204 may comprise performing a real-time classification of each cell. The classification the cells may be performed by using machine learning. In some embodiments, in a learning phase, a training is performed by at least one classifying algorithm selected from a group consisting of Support Vector Machine (SVM), Principal Component Analysis (PCA) algorithm, k-nearest neighbors algorithm, Fisher's linear discriminant, Fisher's nonlinear discriminant, Network Acceleration algorithm (NNA), or any other machine learning algorithm and any combination thereof in a communicable and readable database on the cells in order to generate information data being indicative of the type of cells. The classification of the activation of the DEP module are performed by using the trained machine-learning model.

Automatically processing image data in 204 may comprise performing a sequence of classification, wherein each classification is capable of identifying another type of cells. Automatically sorting the certain type of cells in 206 may comprise isolating at least one certain type of cells from other cells in the flow.

Figure 3A:
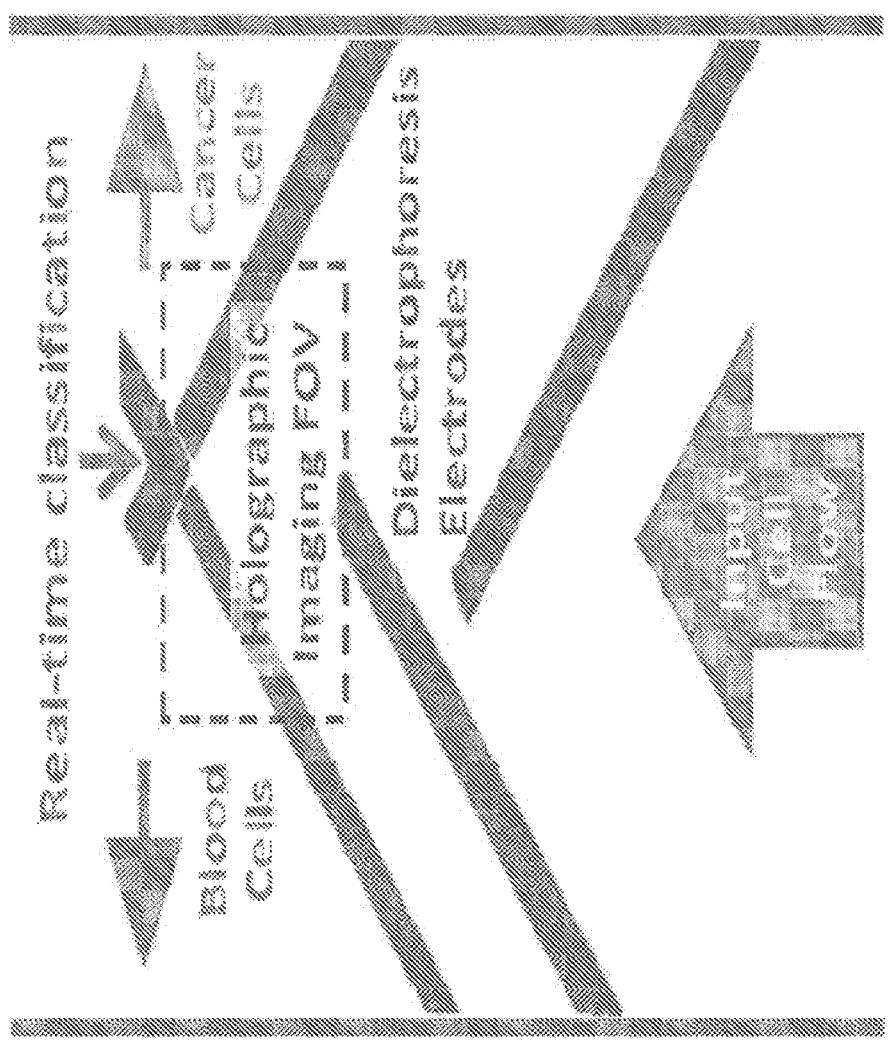
FIG. 3a is a flow chart schematically illustrating a method for label-free imaging and sorting of cancer cells in blood according to some embodiments of the present invention.

The technique of the present invention is not limited to any type of cells to be sorted. The cells may include blood cells, cancer cells, stem cells. For example, the technique of the present invention may be used for the classification of unlabeled cancer cells in blood to enable label-free imaging and sorting of cancer cells in blood. Reference is made to FIG. 3a showing a block diagram 300 schematically illustrating an example of a method for label-free imaging and sorting of cancer cells in blood according to some embodiments of the present invention. In this specific and non-limiting example, the cells are sorted based on the decisions obtained during the cell flow by a label-free quantitative imaging and real-time machine learning classification. The real-time machine learning classification enables to automatically classify cancer cells based on their grade (healthy/primary/metastatic) enabling monitoring cancer progression in cancer patients. The DEP microfluidic module may include a flow chamber containing several DEP electrodes that create between them an altering electrical field, to deflect (negative-DEP) the cells from the electrodes and direct them inside the dielectrophoretic microfluidic module during flow. It should be noted that the negative-DEP and electrode pattern shown in FIG. 3a was the one used for the experiments. This configuration is not limiting and other patterns can also be used to direct and split the cells of interest from the flow. For example, Positive-DEP can also be used to attract the cells to the electrodes. In some embodiments, the method comprises detecting cancer cells and removing them from blood cell background, to further purify CTCs from blood after an initial enrichment.

Figure 3B:
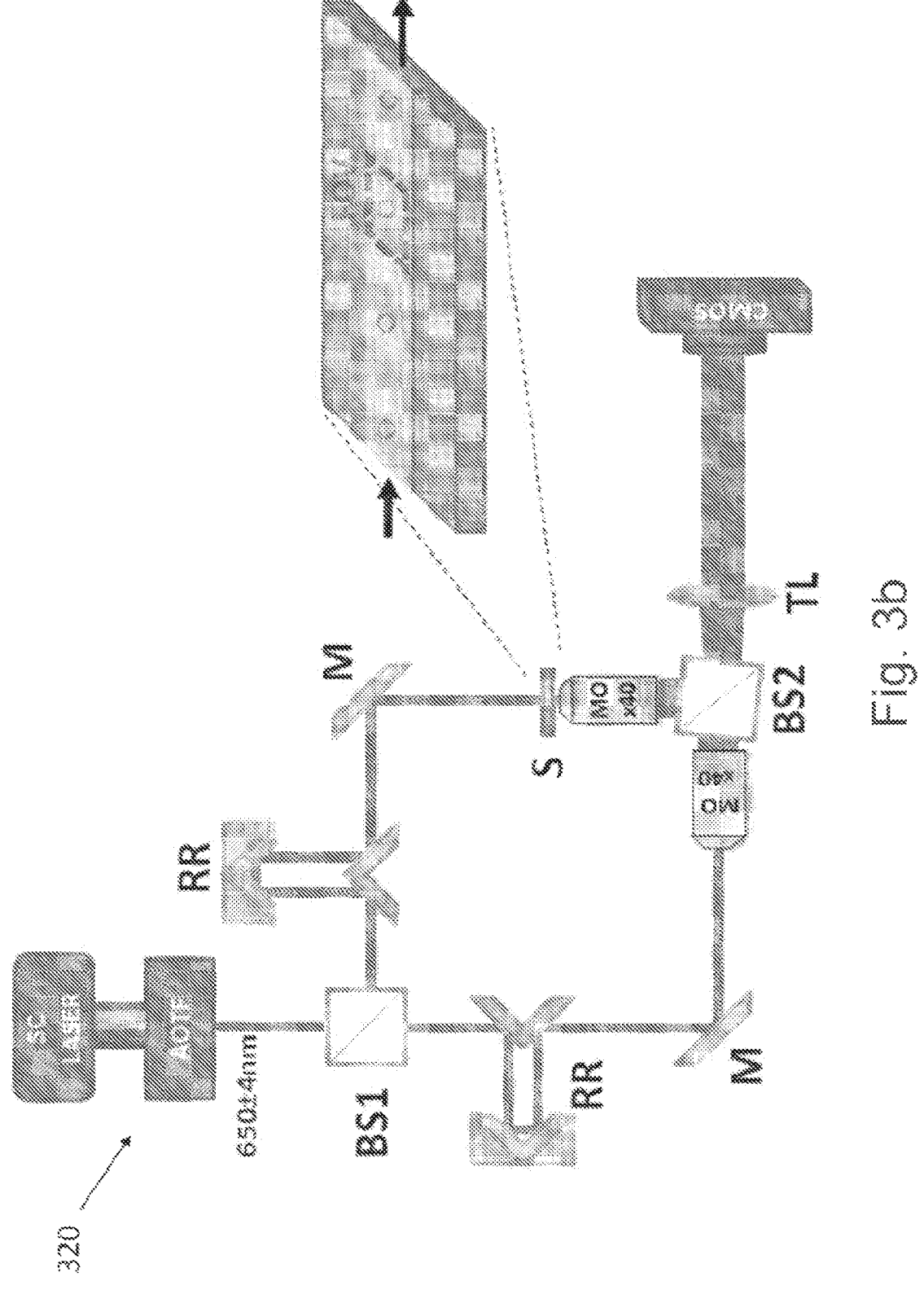
FIG. 3b is a block diagram schematically illustrating a holographic imaging module being configured and operable to acquire and measure the quantitative phase profile of the flowing cells of a sample.

Reference is made to FIG. 3b, showing an example of a holographic imaging module 320 being configured and operable to acquire and measure the quantitative phase profile of the flowing cells of a sample S. In this specific and non-limiting example, the holographic imaging module comprises an interferometric phase microscopy (IPM) module based on an off-axis Mach-Zehnder interferometer being configured to rapidly capture OPD maps of flowing cells (e.g. primary and metastatic cancer cells, as well as different types of blood cells ex vivo). As shown in FIG. 3b, the holographic imaging module 320 comprises a Mach-Zehnder imaging interferometer with an off-axis configuration. In this specific and non-limiting example, the off-axis Mach-Zehnder interferometer comprises an illumination source SC (e.g. supercontinuum laser (SC-400-4, Fianium)) being connected to an acousto-optic tunable filter (AOTF-VIS, Fianium), two beam-splitters BS1 and BS2, two mirrors M, four retroreflectors RR, sample holder S, two microscope objectives MO, one tube lens TL common to both MO, and a CMOS camera that records the off-axis image hologram. Using this holographic imaging module 320, it is possible to reconstruct the sample complex wavefront from a single camera exposure, and thus it is suitable for the acquisition of rapid dynamics, such as cells during flow. The holographic imaging module 320 is illuminated by the illumination source SC of the holographic imaging module 420, being for example a supercontinuum laser source SC (e.g. Fianium SC-400-4), coupled to an acousto-optic tunable filter (AOTF), aligned to emit a low-coherence light with bandwidth of 650 nm±4 nm. However, in this connection, it should be noted that the system is not limited to the use of low-coherence light source and high coherence illumination can also be used. The beam is split into a reference and a sample beams by BS1. The sample beam passes through the sample S, containing cells flowing in a microfluidic channel, as shown in FIG. 3b inset. The dashed rectangle illustrates the field of view (FOV) imaged onto the camera. This beam is then magnified by microscope objective MO (e.g. Newport, 40×, 0.85 NA). In parallel, the reference beam propagates through identical microscope objective MO. Both beams are projected through the tube lens TL (f=200 mm) onto a CMOS digital camera (e.g. Thorlabs, DCC1545M). Since low-coherence illumination may be used to minimize spatial noise and parasitic interferences, retroreflectors RRs on micrometers may be utilized to adjust the beam paths of the sample and reference beams, allowing to obtain off-axis interference on the camera. These two beams interfere on the camera at a small off-axis angle and induce straight off-axis fringes. In addition, the chosen spectral bandwidth allowed obtaining acceptable interference fringe modulation on the entire camera sensor.

Figure 3C:
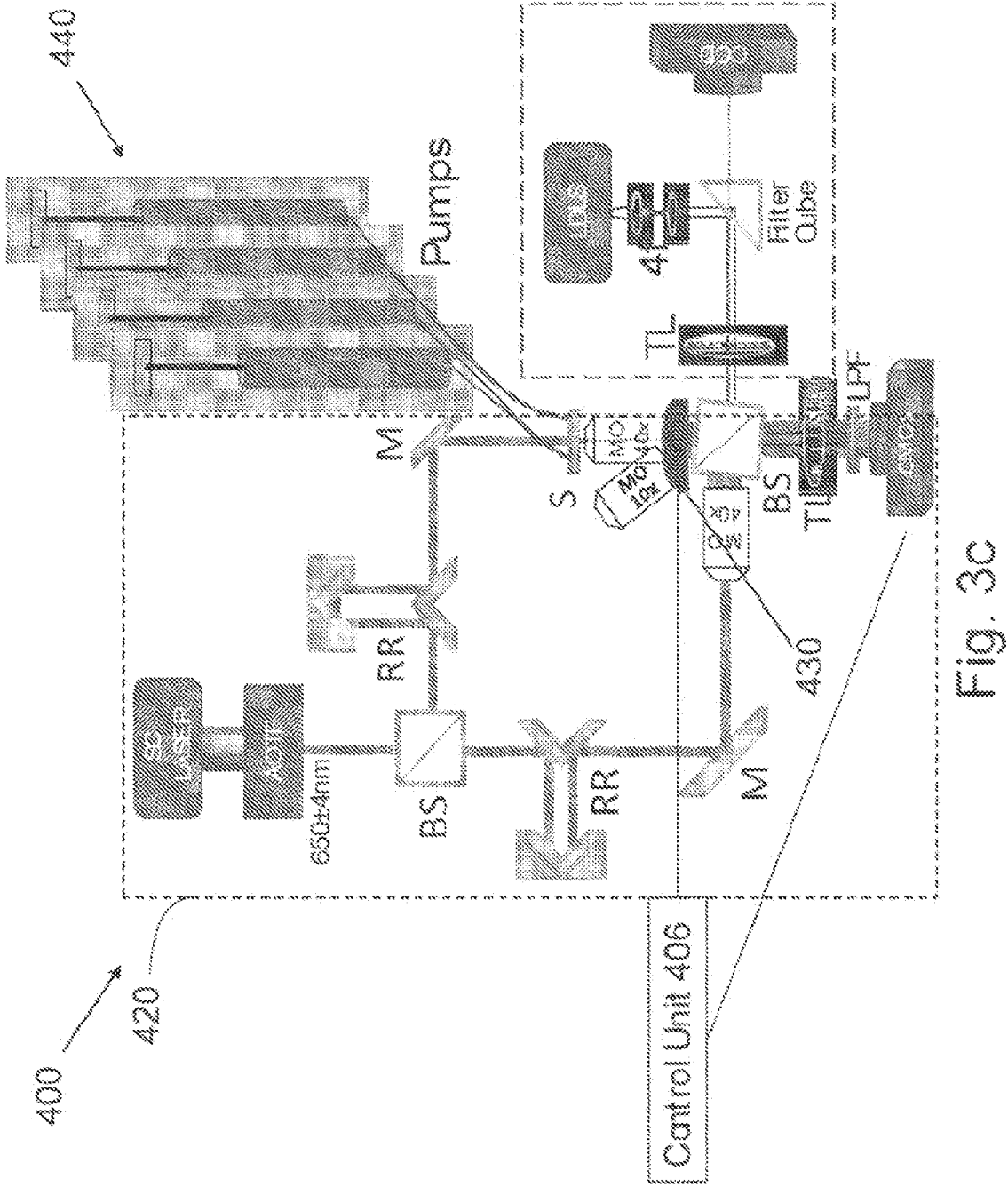
FIG. 3c is a block diagram schematically illustrating an example of a sorting system according to some embodiments of the present invention.

Reference is made to FIG. 3c, showing an example of a sorting system 400 of the present invention. Sorting system 400 comprises holographic imaging module 420 of FIG. 3b being configured and operable to acquire and measure the quantitative phase profile of the flowing cells of a sample S, a DEP microfluidic module 430 a control unit 406 and optionally four microfluidics pumps 440. The collected sorted-out cells may be directed to a storage vessel by using the microfluidics pumps 440. In this specific and non-limiting example, the illumination source SC of the holographic imaging module 420 emits a low-coherence light with bandwidth of 650 nm±4 nm. This corresponds to coherence length of approximately 20 μm, still allowing wide-field off-axis interference on the camera sensor, but now with a decreased level of coherent noise. The high-visibility off-axis interference is set to lie only in a portion of the field-of-view (FOV) being defined as the region-of-interest (ROI) in which the quantitative phase profile of the cell is presented and analyzed. The laser beam splits into a reference beam and a sample beam. The sample beam is impinging the DEP microfluidic module 430 and magnified by a 40× microscope objective (Leica, 440, 0.66 NA), with a tube-lens (f=200 mm) and onto a CMOS camera (Thorlabs, DCx1545). The 40× objective is positioned in a turret, on which a 10× microscope objective (Leica, 439, 0.25 NA) is positioned as well, and can be used to align the sorting system 400 while viewing the dielectrophoretic microfluidic module 430 in lower magnification and obtaining a larger FOV. The reference beam goes through an identical 40× microscope objective, for beam curvature matching with the sample beam. Both beams are combined by the second beam splitter and projected through the tube lens on the CMOS camera at a small angle, where an off-axis hologram with straight interference fringes is created. Retroreflectors RR are used to match the optical-path between the sample and reference beams. In this specific and non-limiting example, the dielectrophoretic microfluidic module 430 is placed inside the holographic imaging module 430. The dielectrophoretic microfluidic module 430 is then viewed through a ×40 microscope objective. The image is taken by a digital camera, and control unit 406 performs a computer algorithm decoding the optical phase delay of the imaged cell. 20 features based on the image phase and amplitude may be calculated. During the experiments, these features were calculated earlier on thousands of phase image to train a machine-learning algorithm called support vector machine (SVM) which uses the features to discriminate and classify between the different cell types. The SVM algorithm may classify each cell that pass through the ROI. If the cell is classified as cancer, a command to activate the sorting process is sent by the control unit 106 to switch the relevant electrode to sort the cell out.

In this specific and non-limiting example, a fluorescence module (in the dashed box) was combined to verify the label-free classification accuracy. Laser-driven light source (LDLS) is used as the fluorescence excitation source, and a CCD camera is used to record the fluorescence images. Low pass filter (LPF) prevents the fluorescence excitation light from getting to the CMOS camera used for holography. The epi-fluorescence system is composed of a laser-driven light source (Energetic, EQ-99 LDLS) and comprises a 4f system to collimate the light, a fluorescence filter cube (Zeiss, filter set 38) to fit to use with green fluorescence protein (GFP), and a digital CCD camera (Zeiss, AxioCam MRm). The fluorescence imaging system was built to have an external validation for the cell label-free classification results, where only the cancer cells emitted fluorescence. The fluorescence excitation light is focused by the objective to a spot in the FOV, located just before the sorting electrodes. Since the emission light is split by the second beam-splitter, an LPF (BrightLine, FF01-496\LP-25) was placed to remove the excitation light and receive the fluorescence emission light on the camera used for the holographic imaging module.

At the end of the process all the CTCs are concentrated in a single reservoir and may be analyzed genetically by a next generation PCR to provide patients with the most beneficial treatment for their disease. During the experiments, the following techniques were used: (1) preparation of blood sample using a filtration kit to remove small sized cells; (2) microfluidics system including pumps, microchannel and electrical components for directing the cells to designated reservoirs; (3) a holographic imaging module imaging cells (e.g. IPM); (4) a database that include geometrical and optical parameters for the recognition of different subsets of cells; (5) a control unit being configured and operable to obtain the captured pictures from the holographic imaging module, analyze the pictures for the formation of an OPD map using the database and activate the electrical components in the microfluidic system thus directing cells of interest to a reservoir. Later, the cells in the reservoir can be analyzed genetically.

In some embodiments, the system further comprising at least one communicable and readable database storing instructions which, when executed by at least one data processor, result in operations comprising: training a machine learning model to identify a certain type of cells in the communicable and readable database in order to generate information data being indicative of at least one cell; and, after the step of training, real time identify the cells by means of the trained machine learning model.

In some embodiments, control unit 406 comprises a data input utility including a communication module for receiving image data being indicative of the flow of cells, an optional data output utility for generating data relating to identified cell(s), a memory (i.e. non-volatile computer readable medium) for storing database i.e. preselected data indicative of different OPD maps, and a data processing utility adapted for identifying a certain type of cells during the flow. Data processing utility may operate as a classifier or may comprise a classifier module. Memory may be relayed via wireless or wired connection by an external unit to a central database. The database may be implemented with Microsoft Access, Cybase, Oracle, or other suitable commercial database systems.

In some embodiments control unit 406 is configured in a cloud-based configuration and/or utilize Internet based computing so that parts of processing utility, and/or memory may reside in multiple distinct geographic locations. Upon identification of certain cells, the data processing utility sends signals to the DEP module 430 to direct the cells along a certain trajectory and sort them. Data processing utility may transmit data regarding the activation of the DEP module via the data output utility, via a data communication (e.g. via cellular network) to a communication module of a central computer. The data processing utility may record the received image data in database in memory and/or may query/cross-reference the received image data with OPD data in the database to identify if the cell is a cell of interest. To this end, the preselected data stored in a database may be used to compare the image data with the OPD maps previously used for identifying cells and stored in the learning database. The memory mat thus be configured for storing a learning database i.e. preselected data indicative of cells correlated with OPD maps. The correspondence between the different OPD maps and the different type of cells may be predetermined. For example, a table of correspondence between the different OPD maps and the different type of cells may be stored in a database. Such table may be stored in the memory. Alternatively, storage may be separate from the server(s) (e.g. SAN storage). If separate, the location(s)

of the storage may be in one physical location, or in multiple locations and connected through any type of wired or wireless communication infrastructure. The database may rely on any kind of methodology or platform for storing digital data. The database may include for example, traditional SQL databases such as Oracle and MS SQL Server, file systems, Big Data, NoSQL, in-memory database appliances, parallel computing (e.g. Hadoop clusters), etc. If memory is configured as the storage medium of the database, it may include any standard or proprietary storage medium, such as magnetic disks or tape, optical storage, semiconductor storage, etc.

The inventors conducted experiments as follows: a blood sample is taken from a cancer patient, and undergo CTC enrichment by filtration (e.g. through a ScreenCell Cyto kit), containing a microporous membrane of 6.5-8 μm pores. This commercial kit captures CTCs and removes smaller cells like erythrocytes and most nucleated blood cells. From each 1 mL of blood, this preliminary filtering results in 11,000 white blood cells and 1-10 CTCs within approximately 3 minutes, with an average CTC recovery rate of more than 90%. This enhanced blood sample is then diluted with 10% Nycodenz, a chemical used to increase the buffer density to help the cells flow smoother. The sample is poured into the DEP microfluidic module of and undergo the final sorting process: As illustrated below, the DEP microfluidic module may include a flow chamber containing several twin-electrodes that create between them an altering electrical field, to deflect (negative-DEP) the cells from the electrodes and direct them inside the dielectrophoretic microfluidic module during flow. The field is created through inducing altering voltage on the electrodes using the control unit (e.g. a computer-controlled generator). The voltage is of 3 Vpp and 1 MHz. All the cells are directed to the same region of interest (ROI), there their hologram is captured. If a cancer cell is detected, the control unit (e.g. a computer-based decision) activates the electrodes and deflect the cancer cell to a reservoir of CTCs, away from the rest of the non-cancer cells. Each cell of the parallel flow is directed to its own outlet port to be collected.

Three types of cancer cells and four types of blood cells were imaged and analyzed. For cancer cells, HT29-GFP cells were used. HT29-GFP are colon adenocarcinoma cells that have been transfected by adenovirus vector to express GFP and neomycin resistance gene. A stable clone was produced by growing the cells with medium supplemented by 600 μg ml⁻¹ G418 (Sigma, SN. A1720). The other two cancer cell types are a pair of isogenic cancer cell lines: colon adenocarcinoma, SW-480 (CCL-228), and metastatic stage of colon adenocarcinoma from the lymph node, SW-620 (CCL-227). The growth medium used for the cancer cells was Dulbecco's Modified Eagle's Medium (DMEM) (BI, SN. 01-55-1A) supplemented with 10% fetal bovine serum (FBS) (BI, SN. 04-007-1A), 4 mM L-Glutamin (BI, SN. 03-020-1B) and 1% antibiotics (BI, SN. 03-033- 1B). The cell lines were incubated under standard cell culture conditions at 37° C. and 5% $CO_2$ in a humidified incubator until 80% confluence was achieved. Blood was used to isolate four types of blood cells: erythrocytes, lymphocytes, monocytes, and granulocytes. A dilution medium composed of phosphate-buffered saline (PBS) (BI, SN. 02-023-1A) was prepared supplemented with 2 mM ethylenediaminetetraacetic acid (EDTA) (BI, SN. 01-862- 1B), 10% FBS and 6% Nycodenz (Alere Technologies AS, SN. 1002424). EDTA prevents bacteria growth inside the sample; FBS keeps the vitality of the cells for a longer time; Nycodenz was added to compare the density of the dilution medium to the cells density to achieve uniform distribution of cells inside the sample while flowing in the microfluidic channel. Since erythrocytes population in the blood is very high (1000:1), the blood was dissolved in the dilution medium with a proportion of 1:250. To isolate different leucocyte populations, 2 ml of blood mixed with 2 ml PBS supplemented with 2 mM EDTA was layered on top of 2 ml of Ficoll-Paque PLUS (GE Healthcare, SN.17-1440-02) and centrifuge them for 20 minutes in 500 g, at room temperature. Then, two layers were extracted: (1) The interphase containing the Peripheral blood mononuclear cells (PBMCs) for the isolation of lymphocytes and monocytes. (2) The lower layer, containing granulocytes and erythrocytes. The interphase was centrifuged with PBS supplemented with 2 mM EDTA (all centrifugations hence are 500 g, 5 minutes in room temperature), the supernatant layer was removed. For the isolation of lymphocytes and monocytes, commercial kits were used (for lymphocytes CD4+: EasySep, SN. 17952, for monocytes: EasySep, SN. 19359) according to the manufacturer's instructions. To remove plasma, the lower layer was added with PBS supplemented with 2 mM EDTA to reach a volume of 10 ml and then centrifuged. The upper phase was discarded, and the last stage was repeated. To lysis the erythrocytes, 4° C. ammonium-chloride solution (STEMCELL, SN. 07850) was added, the mix was incubated on ice for one hour. Afterward, the cells were washed and centrifuged again with PBS supplemented with 2 mM EDTA for the isolation of granulocytes. Each of the samples was examined and counted four times to calculate their concentration, and the samples were found to contain only one type of cells, as expected. These pure samples of blood parts are then remixed to have a desired selected concentration, ranging from 300 to 1000 cells per μl. Alternatively, to cope with blood originated from cancer patients, preliminary enrichment of the blood sample is done by filtering with the ScreenCell Cyto kit. The kit contains a membrane with microspores of 6.5-8 μm. The membrane captures the CTCs and the larger white blood cells and removes smaller cells (e.g., erythrocytes). From 1 ml of full blood, within 3 minutes of filtration, $10^4$ cells containing a mixture of white blood cells and CTCs with a ratio of 1-10 CTCs to 11,000 white blood cells, and an average CTCs recovery rate >90% are left.

To extract the quantitative phase maps from the acquired off-axis image holograms, the off-axis interferometry Fourier-based algorithm was used, including a digital 2-D Fourier transform, filtering one of the cross-correlation terms, and an inverse 2-D Fourier transform, where the argument of the resulting complex-wavefront matrix was the wrapped phase of the sample. Each off-axis hologram obtained by the holographic imaging module undergoes a quantitative phase reconstruction process before entering the classification algorithm. In other words, the ROI is determined inside the FOV manually before flowing starts, in relation to the sorting DEP electrode positions. For each off-axis imaging hologram, the ROI is cut, and the 2D Fourier transform of the ROI is calculated. One of the cross-correlation terms is cut and undergoes a 2D inverse Fourier transform, resulting in the complex wavefront of the light passing through the sample.

To compensate for stationary aberrations and field curvatures, a phase map was subtracted from the wrapped phase map of the sample that is extracted from a hologram acquired with no sample present. In other words, to remove aberrations and field curvatures, this complex wavefront is divided by the background wavefront, i.e., the complex wavefront obtained by the same reconstruction process but without the cell present in the ROI. The quantitative phase profile is the angle of the resulting complex wavefront. This phase may be wrapped around $2\pi$. To resolve this phase ambiguity, an unweighted least-squares phase unwrapping algorithm was applied. The resulting unwrapped phase is multiplied by the wavelength and divided by $2\pi$, resulting in the optical phase delay (OPD) map of the sample, and defined as follows:

$$OPD_c(x, y)=[\bar{n}_c(x, y)-n_m]\times h_c(x, y) \qquad (1)$$

where $n_m$ is the RI of the medium, $h_c$ is the thickness profile of the cell, and $\bar{n}_c$ is the cell integral RI, which is defined as follows:

$$\bar{n}_c(x, y) = \frac{1}{h_c}\int_0^{h_c} n_c(x, y, z)dz. \qquad (2)$$

In the resulting OPD profile, the cell area was isolated by a simple threshold, followed by a morphological dilation. In cases of frames with no cell, the classification process was not needed. Therefore, another threshold was applied for the minimum size of the connected component. A maximum size threshold was also applied in cases of attached cells that could not be classified as one object. Partial images of cells on the edges of the FOV were not classified as well. Using the above-described methods, a dataset containing the OPD information was created across the cell areas only and the different parameters that were based directly on the OPD map defined in Eq. (1) were calculated, without decoupling the cellular thickness profile from the refractive index as a prior stage.

The features that have been extracted from each OPD map divide into two categories: (1) 2D morphological features; and (2) 3D quantitative features. The 2D morphological features are based on the binary image indicating the cell area only. The 3D quantitative features are based on the OPD map across the cell area. These features are presented in Table 1. Table 1 below show 2D (left) and 3D (right) handcrafted features extracted in real time from the OPD profile of the flowing cells. The 3D quantitative features rely on previous works that demonstrate the ability to distinguish between the different stages of the cell lifecycle, as well as other biological phenomena (11, 37, 38).

TABLE 1

| | Cell 2D morphological features | Cell 3D quantitative features |
| --- | --- | --- |
| 1 | Diameter | Mean |
| 2 | Area | Energy |
| 3 | Major axis length | Volume |
| 4 | Minor axis length | Area to Volume ratio |
| 5 | Minor to Major ratio | Dry mass |
| 6 | Convex Area | Variance |
| 7 | Eccentricity | Kurtosis |
| 8 | Circularity | Skewness |
| 9 | | Contrast |
| 10 | | Entropy |
| 11 | | Homogeneity |
| 12 | | Correlation |

The OPD map is an image containing quantitative values that represent the optical thickness of the sample. Since it is quantitative (i.e., contains meaningful optical thickness values on each of the spatial map points), it can be used to calculate both morphological and content-related features of the inspected cell. In earlier work [15, 5], these features were described and as well as the way to use them to discriminate between different types of cells. It should be noted that the algorithm works well for one cell in the ROI simultaneously. For the classification between cancer cells and blood cells, a support vector machine (SVM) algorithm, a common machine-learning algorithm, was used. A dataset from nearly 6,300 static and dynamic OPD images of different cell types (HT29-GFP, SW480, SW620 cancer cells, erythrocytes, monocytes, lymphocytes, and granulocytes) was created for training and testing the algorithm (80% of data was for training and the rest 20% for testing). This classifier receives the reconstructed unwrapped OPD image, extracts 20 features based on 2D morphological features and optical topology features. Eight 2D features are drawn from the binary image (area, diameters, eccentricity, and solidity), the rest of the features are OPD based (mean value, energy, volume, dry mass, variance, kurtosis, skewness, contrast, entropy, homogeneity, and correlation). The algorithm finds a discriminative hyperplane in the features space to distinguish and classify the data points or cells. A radial basis function kernel was used for one-class learning. For dimension reduction and for creating new highly discriminating features based on a linear summation of the extracted original features, principal component analysis (PCA) was then used. Principal component analysis (PCA) is a common method for dimension reduction and for finding highly discriminative features. The PCA method is based on projecting the data onto a lower-dimension subspace, and receiving new features, which are linear combinations of the original features. The first principal component has the largest possible variance of the data, and therefore enables better discrimination between the classes, the second principal component has the second largest variance of the data, and so on.

The DEP microfluidic module was configured to sort specific selected cells. The dielectrophoretic microfluidic module was designed to use the negative-DEP technique to deflect flowing cells from the electrodes and direct them left or right by applying a voltage at the correct time [9]. A square wave of 1 MHz and 3-5 Volts was applied on the electrodes to exert the DEP phenomenon. The electrodes were controlled by a computer-activated proprietarily developed generator designed for this type of DEP modules. Using these parameters, flow rates up to 20 $\mu$l hr$^{-1}$ were controlled. The cells flow in and out of the dielectrophoretic microfluidic module may be performed by using four low-pressure pumps (Cetoni, neMESYS 290N) in operating rates of 0.5 $\mu$l hr$^{-1}$ and up to 20,000 $\mu$l hr$^{-1}$. In this specific and non-limiting example, one pump was used to insert the cells, one pump was used for washing, one pump was used for collecting the cancer cells, and one pump was used for collecting the non-cancer cells.

Figures 4A, 4B:
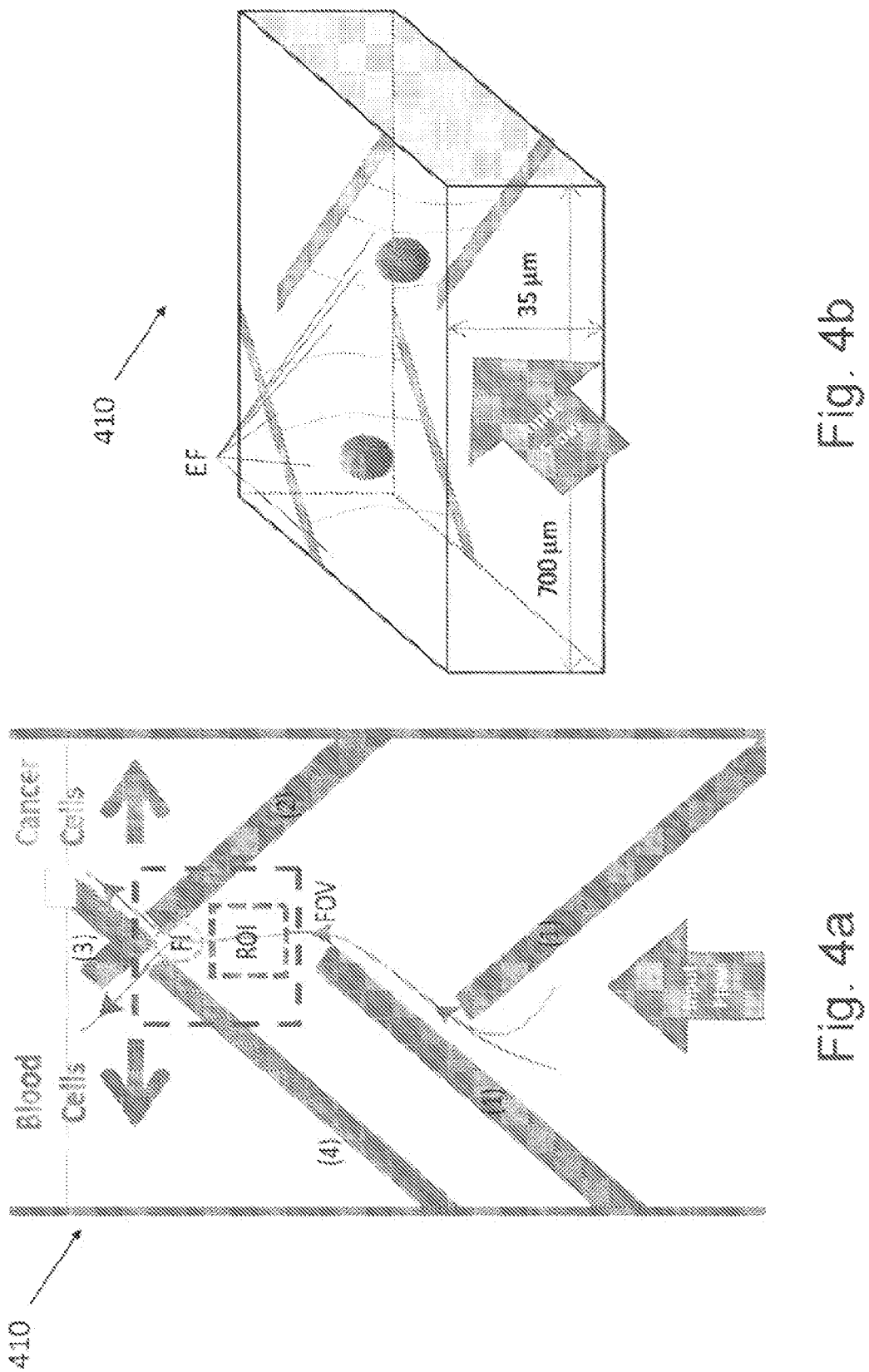
FIGS. 4a-4b are block diagrams schematically illustrating a representation of an example of a DEP microfluidic module according to some embodiments of the present invention.

Reference is made to FIGS. 4$a$-4$b$ showing a schematic representation of an example of a DEP microfluidic module 410 defining a microfluidic channel. In particular, FIG. 4$a$ shows a top view of a DEP microfluidic module 410 comprising an array of spaced-apart electrodes numbered (1)-(4) positioned on both sides of the channel dielectrophoretic microfluidic module 410. As described above, the electrode pattern shown in FIGS. 3$a$ and 4$a$-4$b$ is a specific and non-limiting example. Electrodes (1)-(4) may have the same or different lengths. In this specific and non-limiting example, electrodes (1) are a pair of electrodes positioned on both sides of the channel of the dielectrophoretic microfluidic module 410 in an intersecting configuration defining a space between them through which cells might flow. Electrodes (1) are configured for focusing the cells into the imaging FOV and the holographic ROI. Electrodes (2) and (4) are also positioned in an intersecting configuration and are configured to push the cells to either side of the DEP microfluidic module 410, per the sorting demands obtained by the control unit (e.g. automatic classifier module). One electrode of the electrodes pair (1) and electrode (4) and the second electrode of the electrodes pair (1) and electrode (2) are positioned along parallel axes respectively on an opposite side of the dielectrophoretic microfluidic module 410 at different distances. Electrode (3) has a special angular configuration being configured to separate between the cells of different types and to increase the distance between cell streams. Electrode (3) define a space with electrode (4) and electrode (2) to enable the cells to flow in between to a different side of the channel. The area marked as FI stands for the fluorescence imaging region (used for validation of the label-free real-time classification process). The electrodes (1)-(4) are positioned to define a sorting trajectory for the flow of cells along the dielectrophoretic microfluidic module 410. A flow path of the sorting trajectory of the cells is indicated by arrows. FIG. 4b shows a non-limiting example of a 3D view of the DEP microfluidic module 410 with the pair electrodes (1), together with an example of the DEP microfluidic module cross-section length and thickness. Each electrode is in-fact a pair of two thin electrodes (e.g. about 2 nm), located at the top and the bottom of the channel. The lines EF illustrate the electric field lines with cells flow near them. The set of electrodes (1) can be always active and used to center and direct the cells into the FOV and ROI. Electrode (3) may also be continually active. Electrodes (2) and (4) may be operated in an alternating manner on a real-time command of the control unit. Inside the FOV, in the ROI region, the OPD was calculated, and each cell was classified to determine whether it is a cancer cell or not. If it was classified as cancer, dielectrophoretic microfluidic module 410 is activated operating at least one electrode by alternatively switching on or off one or more relevant electrodes to tilt the cells of interest out. For example, electrode (2) is switched off, electrode (4) is switched on, to flow the cell to the right, away from the waste flow. After a predetermined number of frames, the electrodes are switched back to guide the cell to the waste by default. The sorting system may be controlled in real-time by a control unit executing a multilevel algorithm. Each holographic frame taken by the camera undergoes the OPD reconstruction algorithm, with the OPD map in the ROI visualized on the computer screen. For the pre-designed samples, all the cells that entered the DEP microfluidic module 410 flow to the ROI, usually one at a time, using the concentration mentioned above of 300-1,000 cells $\mu l^{-1}$. The cells inside the ROI are classified during their flow. If identified as cancer, the control unit is activated by the time it takes the cell to flow and reach the DEP electrodes so that the sorting can happen on time. If a cancer cell arrives at the FI region marked in FIG. 4a, it emits fluorescence light (since only the cancer cells are GFP modified or stained). Recording the fluorescence image in the FI region by the two cameras is used for validating the correctness of the automatic sorting decision of the real-time label-free process.

Figure 5A:
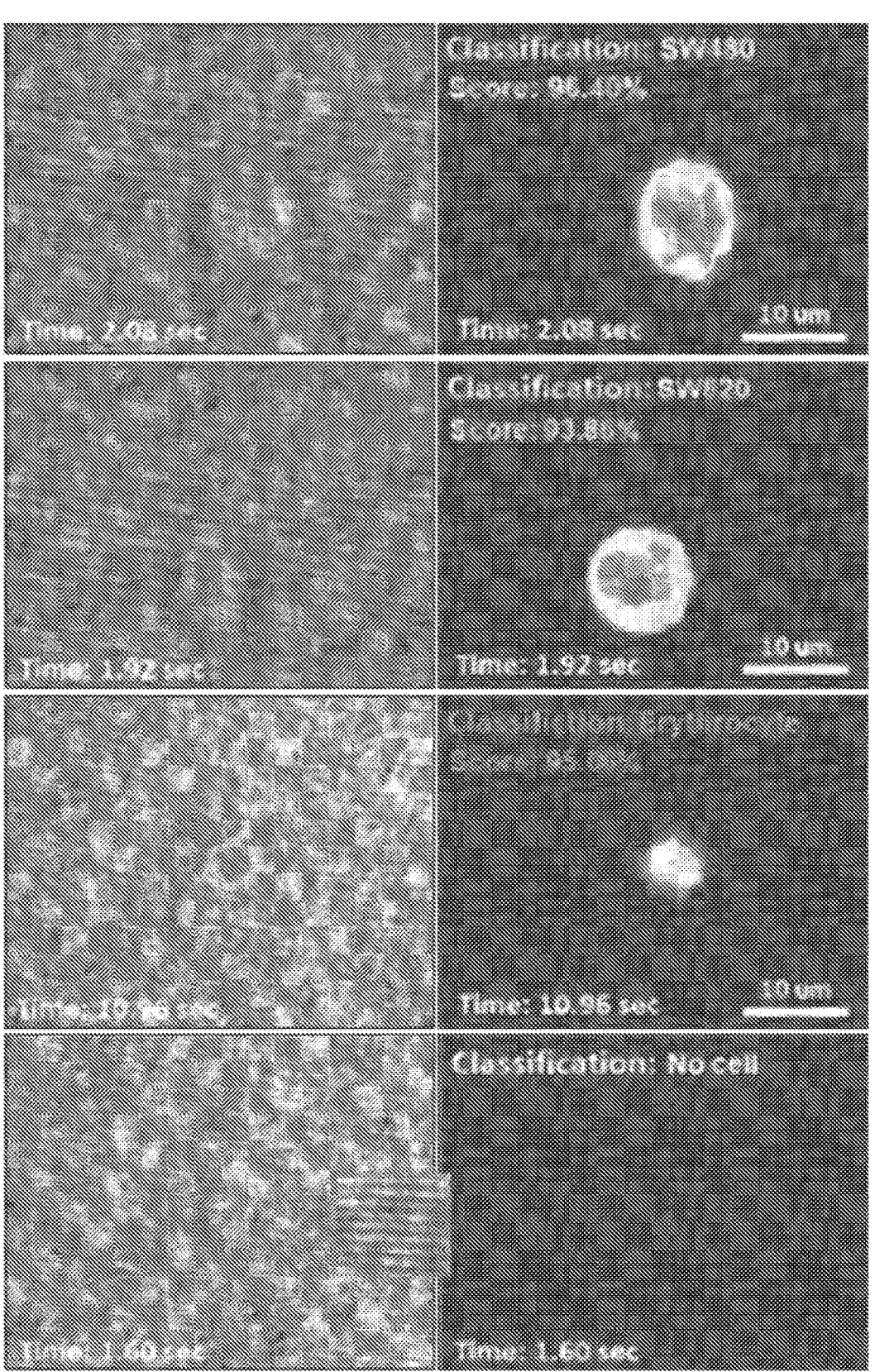
FIG. 5a presents snapshots of OPD maps taken while the cells are flowing in the microfluidic channel, with the real-time quantitative-imaging visualization and classification results during cell flow.
Figure 5A:
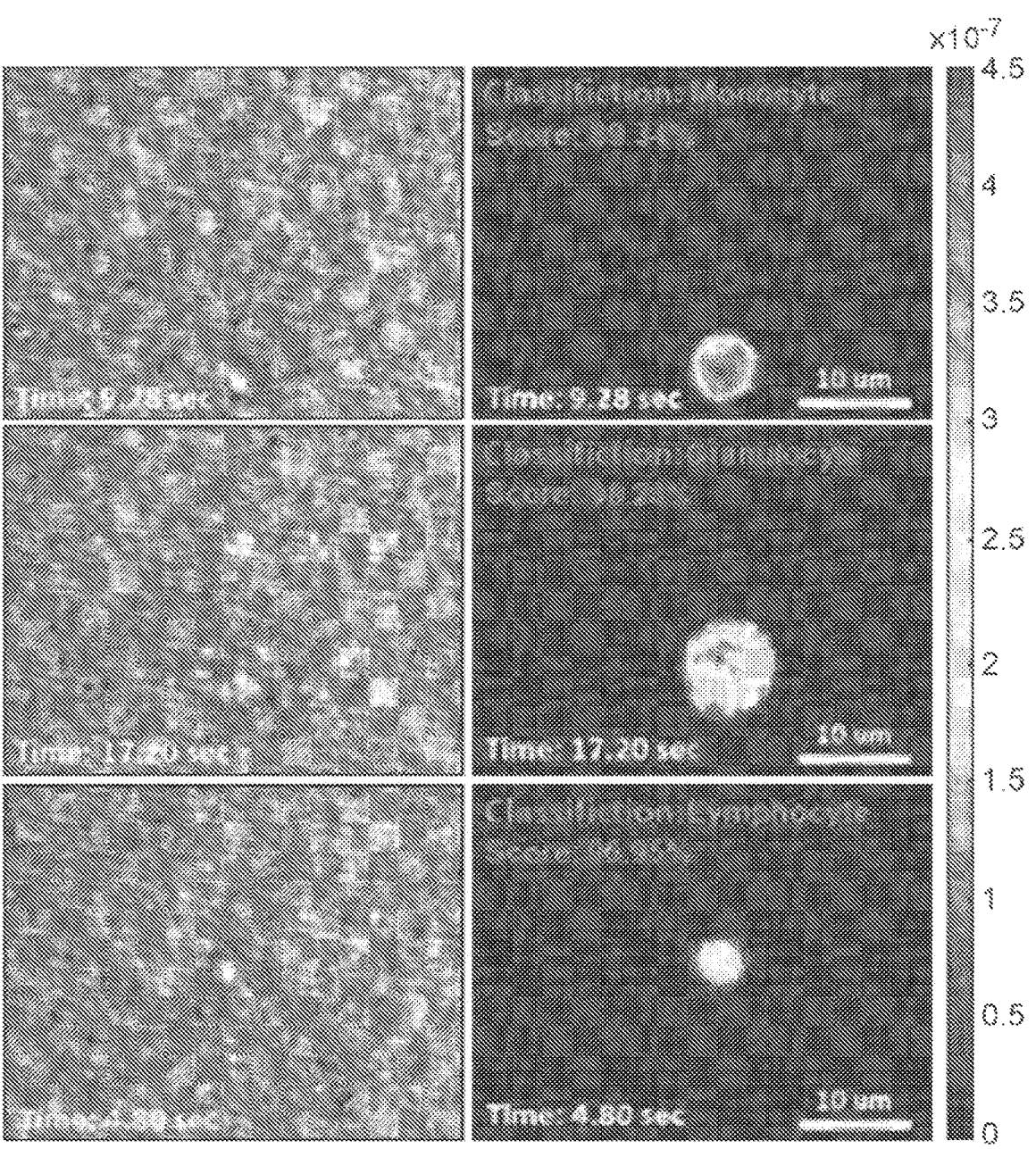

The ability to analyze stain-free isolated cells is important for flow-cytometry via quantitative imaging of cells during flow. FIG. 5a presents snapshots of OPD maps taken while the cells are flowing in the microfluidic channel, with the real-time quantitative-imaging visualization and classification results during cell flow. More specifically, FIG. 5a shows snapshot from real-time classification videos, presenting quantitative phase microscopy of live unlabeled cells flowing in a microfluidic channel. Each pair of images depicts the same frame, where the left image is the original off-axis hologram captured by the camera, and the right image is the OPD profile processed in real-time. The classification results are written on the top. Colorbar represents OPD values in meter. The classification result and the confidence score of the classifier prediction are presented on the top. Some of the cells have been classified as a cancer cell, and some of the cells have been classified as a blood cell.

Figure 5B:
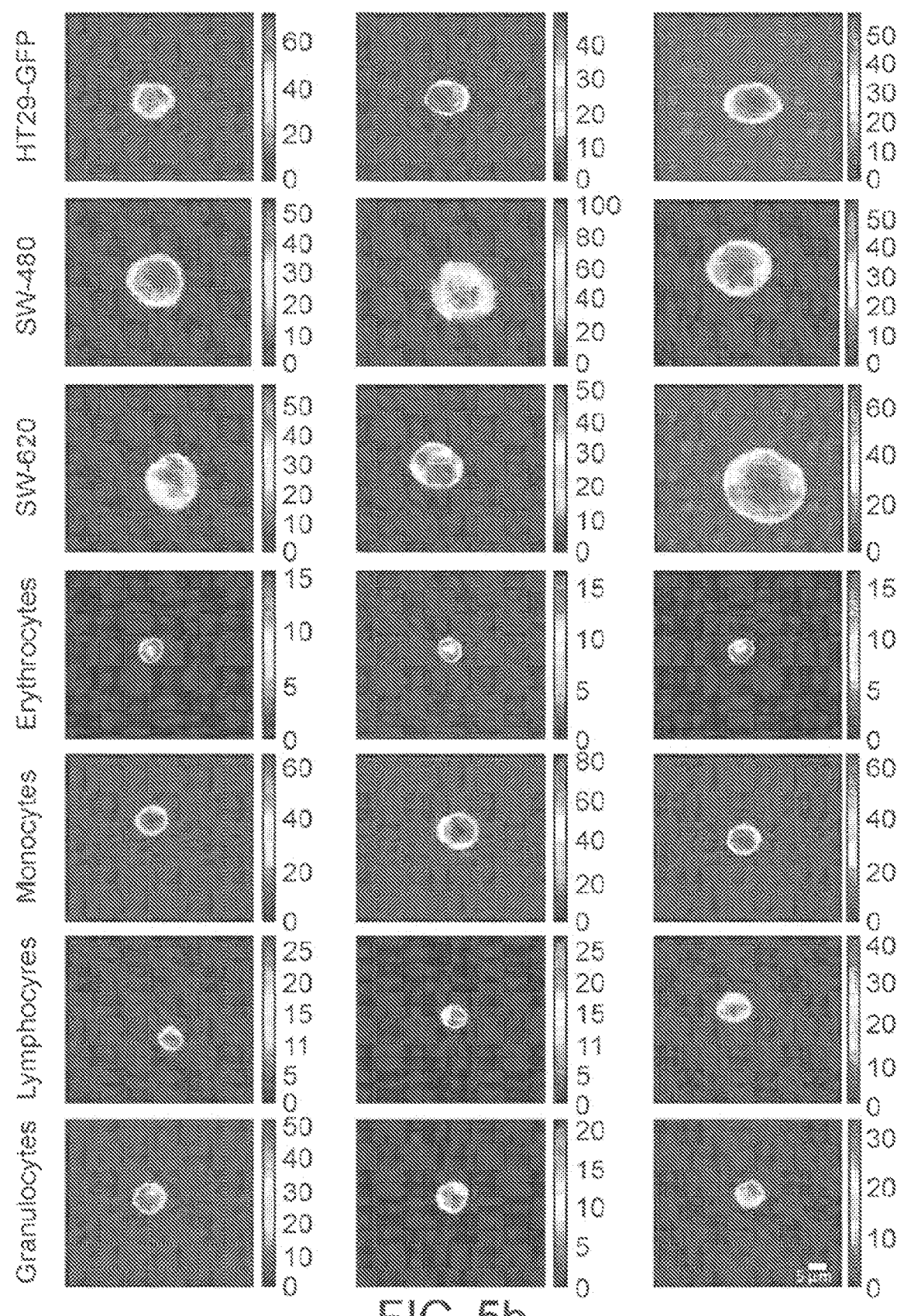
FIG. 5b show examples of OPD images used for training for seven types of cells, demonstrating that cells are all driven to the ROI of the classification area and are later sorted by the electrodes.
Figure 6:
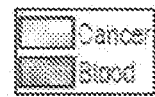
FIG. 6 shows histograms of different features extracted from the OPD profiles of cancer and blood cells.
Figure 6:
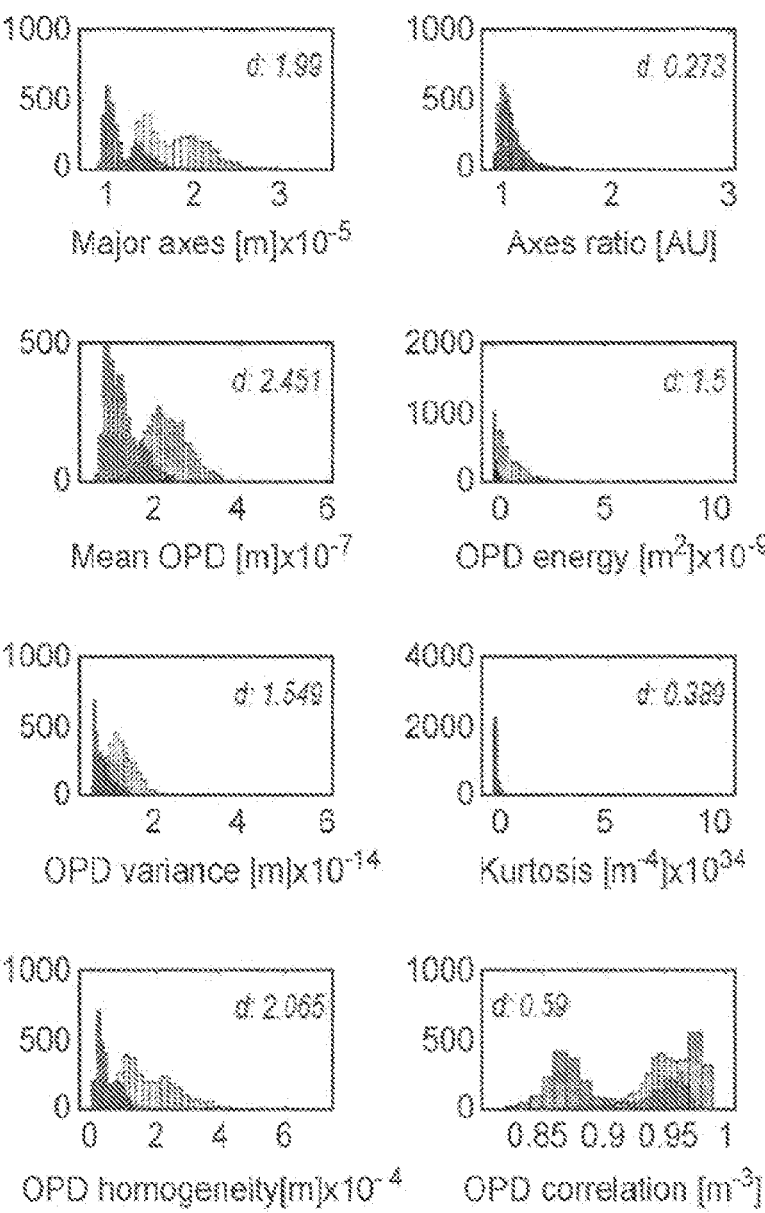
Figure 7:
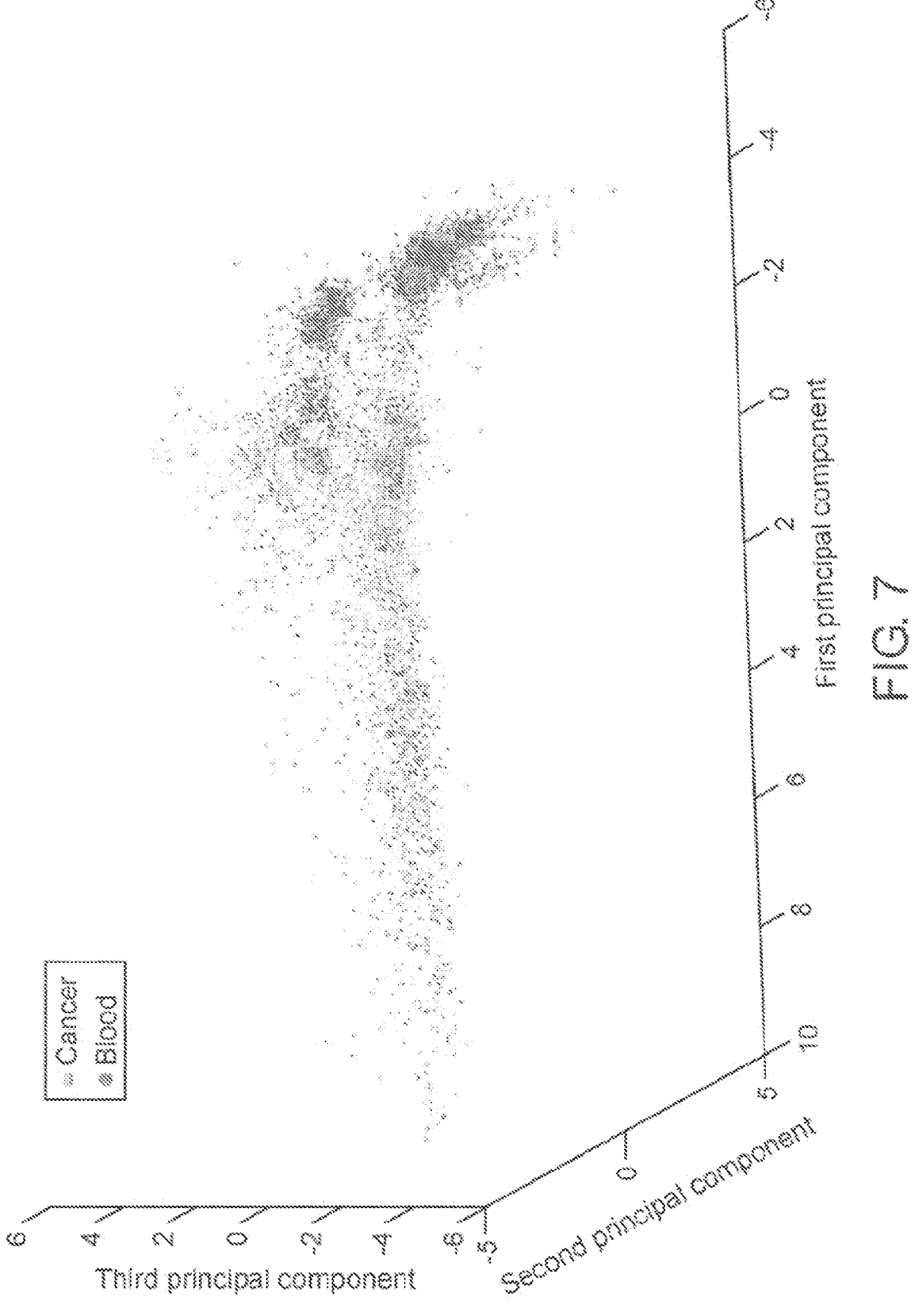
FIG. 7 shows a scatter plot showing the discrimination between blood and cancer cells for the first three principal components calculated by the PCA analysis.

For classification, the more complex task is classification of white blood cells and cancer cells, since red blood cells and platelets are much easier to detect, since they are very different than cancer cells. A data set of about 4,000 OPD maps of two types of colorectal cancer cells (SW480 and SW620) and four types of blood cells (granulocytes, lymphocytes, monocytes, and erythrocytes) was created. Reference is made to FIG. 5b showing examples of OPD images from the acquired database of quantitative phase images of cancer (SW620, SW480) and blood cells used for training for seven types of cells, demonstrating that cells are all driven to the ROI of the classification area and are later sorted by the electrodes. Colorbar represents OPD values in meter. The machine-learning classifier was tested for separation between cancer and non-cancer cells. Prior to the separation during flow, by running the algorithm on 20% of the dataset, 98.22% accuracy of separation was obtained. OPD values are in $10^{-8}$ m. The Cohen's d values between the two groups (cancer cells and blood cells) per each feature, are shown in FIG. 6. FIG. 6 shows histograms of different features extracted from the OPD profiles of cancer and blood cells. Many features present a very large difference between the two cell types. The blood histograms are characterized by two peaks, noting the difference between red blood cells and white blood cells, where the left peaks are attributed to red blood cells, which are generally smaller. Using the Cohen's d analysis, features displaying d>1.5 are with a large distance between the histograms and are the strongest features to use for classification (e.g., cell diameter, minor axes and area, and also mean OPD, OPD volume, and dry mass [5]). The PCA takes this into account. FIG. 7 shows the discrimination between the two types of cells for the first three principal components (out of ten principal components) calculated by the PCA. FIG. 7 shows a scatter plot showing the discrimination between blood and cancer cells for the first three principal components calculated by the PCA analysis (the actual classification was done based on ten principal components, so the discrimination is even better than shown here).

Using the holographic imaging module and the DEP flow module of the present invention, electrodes (1), (2) and (3) were turned on, the DEP microfluidic module and syringes were filled with buffer solution (PBS+10% FBS) to remove air and loaded a remodeled blood sample spiked with SW480 cancer cells, which represent the CTCs, in the ratio of 3:5:2 (cancer:white blood:red blood cells). Total cell concentration was 300 cells $\mu l^{-1}$. This low number of cells was used to decrease the probability of having more than one cell at a time in the ROI or clustering. This ratio was chosen to demonstrate the system sorting abilities and is much higher than the ratio of CTCs in blood. For this sorting system, the ROI size was approximately 60 μm×40 μm. The flow was set at rates between 4-7 μl $hr^{-1}$, or 45-80 μm $sec^{-1}$, per the DEP microfluidic module cross-section (700 μm×35 μm), giving us half to one image of cell per sec. The framerate for this experiment was 8 frames per second (FPS), so each cell had about 2-5 frames in the ROI. The OPD map was imaged and reconstructed of each cell individually and classified to cancer or non-cancer cell using the machine-learning classifier. This automatic decision activated the control unit controlling the electrodes to remove the detected cancer cell from the main flow. For validation only, the SW480 cancer cells were labeled using acridine-orange fluorescence dye, to show if the classifier is precise. The classification process was carried out for each frame in real-time (during cell flow). Electrode switching, once a cancer cell was detected, was active for a defined number of frames as follows: the distance between the ROI and the sorting area near electrode 3 was less than 60 μm or about 1-1.5 seconds for this cell velocity. Since the reaction time of the electrodes was 7 ms, and the images were acquired at 8 FPS, the electrodes were set to stay in the same state after command for 15-20 frames, to allow the cell to be sorted as required. Table 2 below shows the sorting process timing, from an image taken until the sorting electrodes switches. Average values are displayed. SVM features and classification happen only when a cell is present in the ROI.

TABLE 2

| Step | | Time [ms] | Total time [ms] |
|---|---|---|---|
| Image acquiring | | 45 | — |
| Phase retrieval | 2D FFT | 26 | 71 |
| | Phase unwrapping | 2 | 73 |
| Cell Segmentation | Threshold | 0.1 | 73.1 |
| | Holes' filling | 3.5 | 76.6 |
| | Dilation | 5 | 81.6 |
| | Largest object | 1.5 | 83.1 |
| | 3D mask | 3 | 86.1 |
| No cell check | Area size (big/small) | 2.7 | 88.8 |
| | Edges | 0.4 | 89.2 |
| Feature's extraction | | 9 | 98.2 |
| Classification | | 10 | 108.2 |
| Total classification time | | 63.2 | |
| Electrode switching time | | 7 | 115.2 |
| Saving frame | | 1 | 116.2 |
| Total time | | 60-120 | |
| Frames per second [FPS] | | 8-16 | |

Figure 8A:
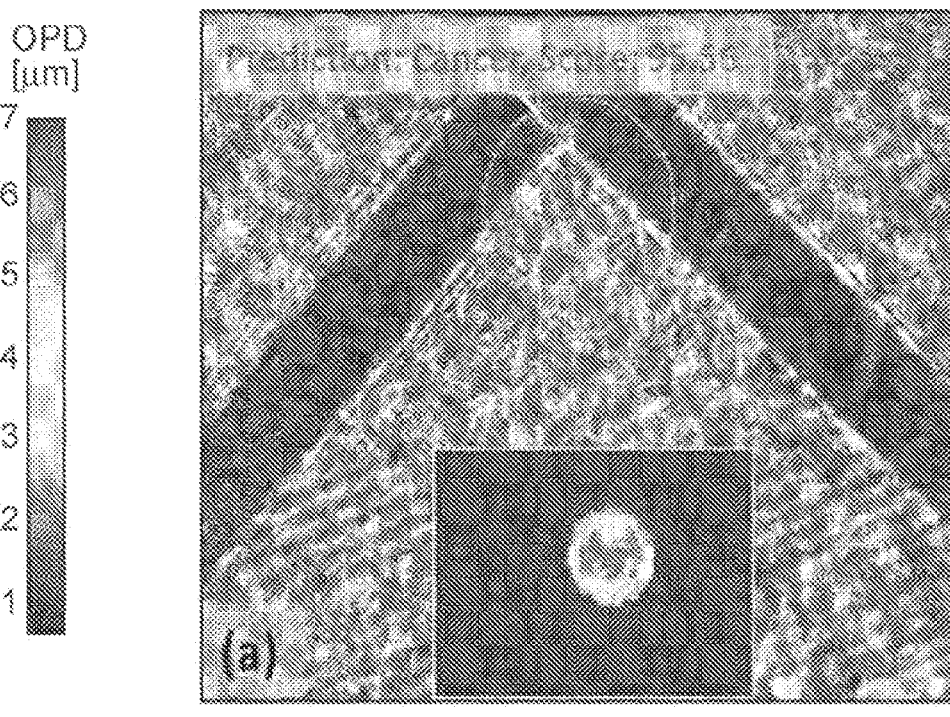
FIGS. 8a-8d and 9a-9d show the FOV with a cell flowing into the ROI.
Figure 8B:
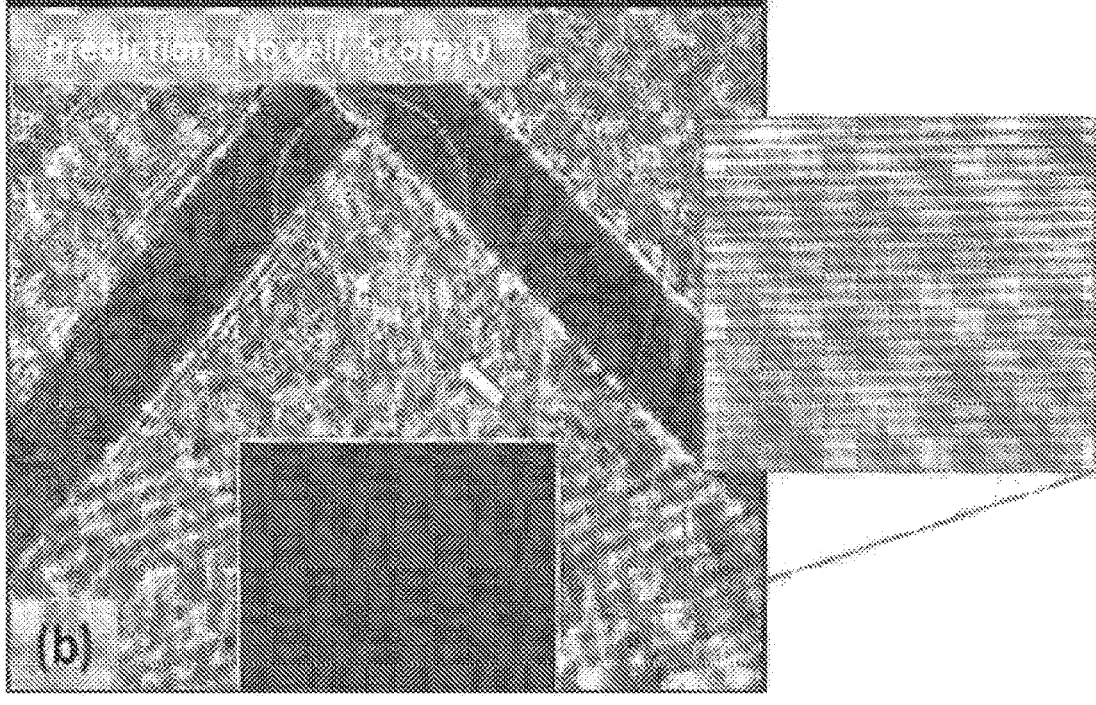
Figure 8C:
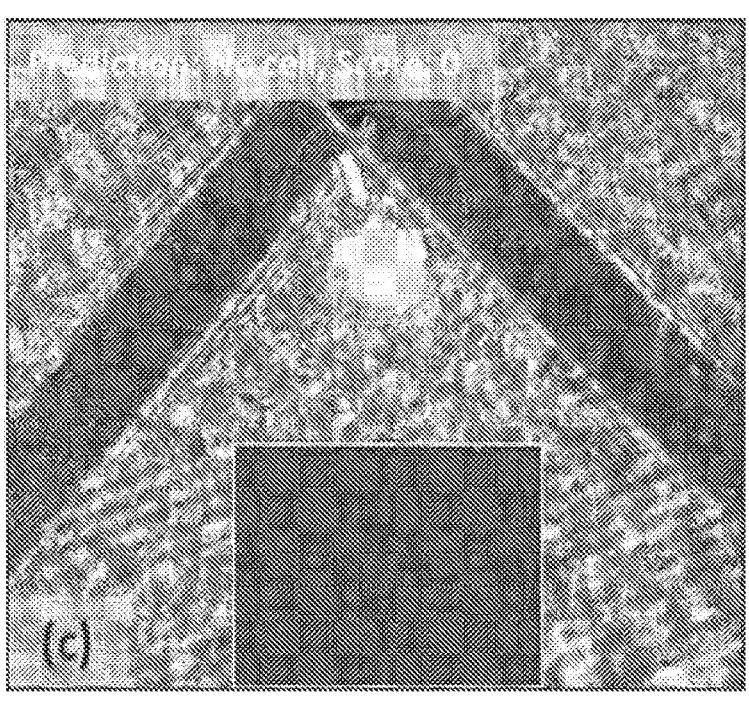
Figure 8D:
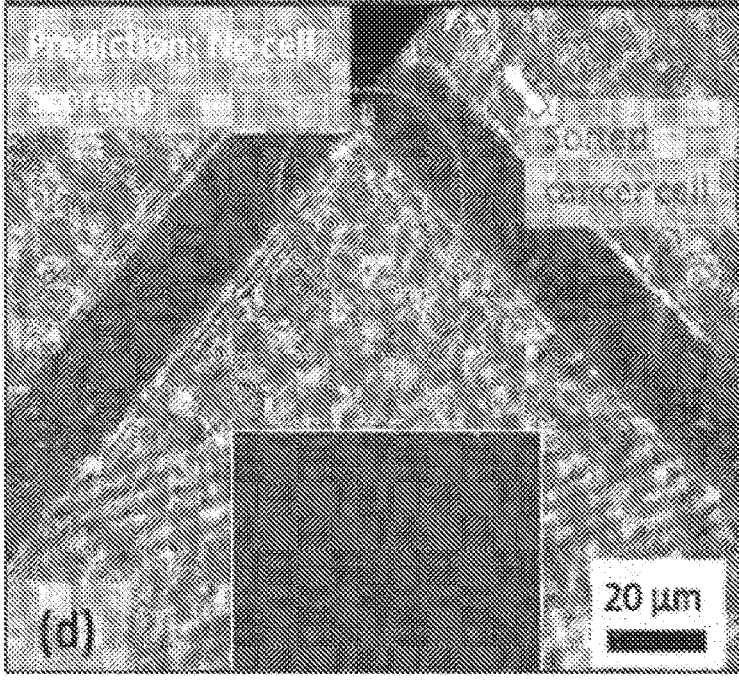
Figure 9A:
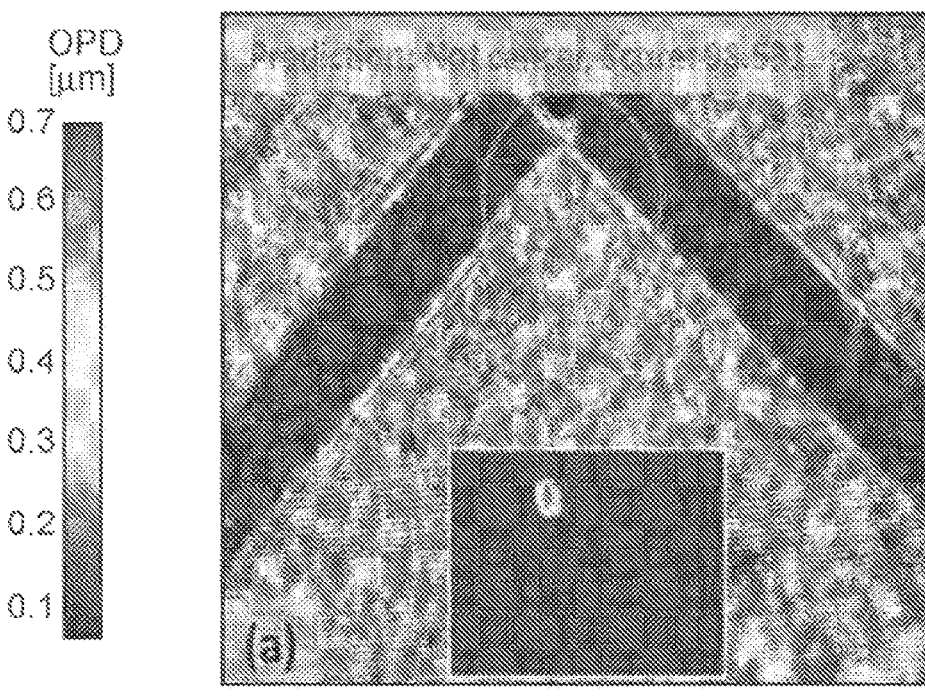
Figure 9B:
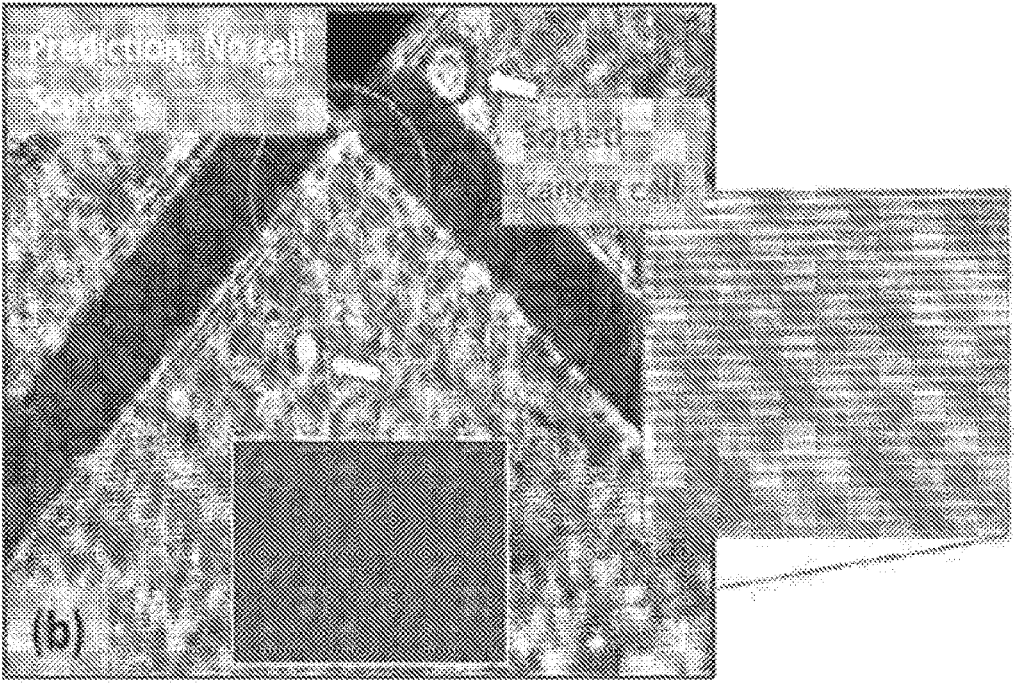
Figure 9C:
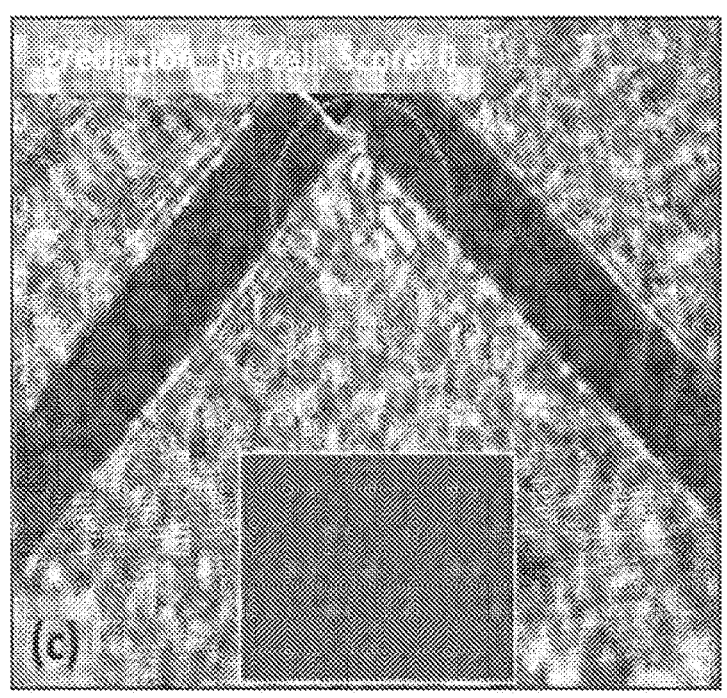
Figure 9D:
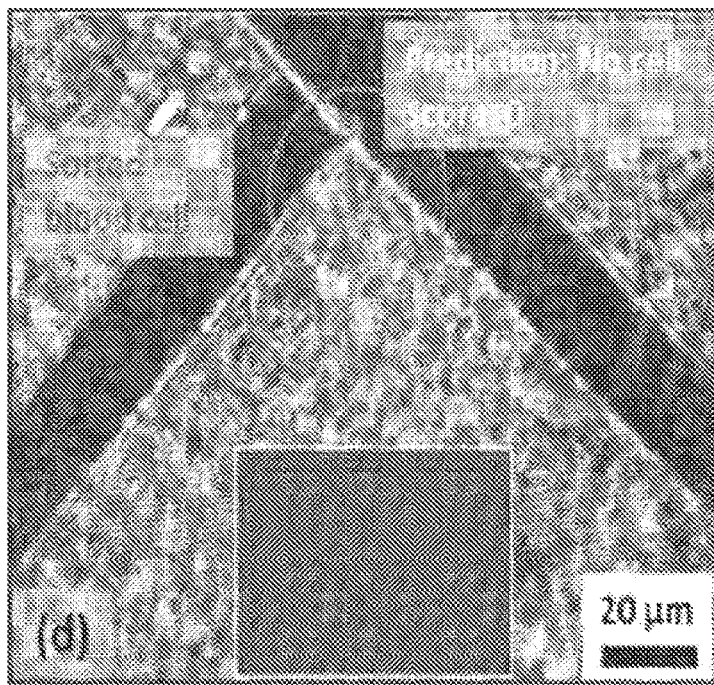

Examples from experiments are shown in FIGS. 8a-8d and 9a-9d. FIGS. 8a-8d and 9a-9d show the FOV with a cell flowing into the ROI. The classifier results and score (confidence level) calculated in real-time are shown at the top of each frame. For validation of the label-free sorting decision, the cell continues to flow to the fluorescence area, where only the cancer cell emits light. The fluorescent channel was used for validation only and did not affect the operation of the electrodes, which were solely dictated based on the label-free IPM data. If a cancer cell was detected by the holographic imaging module, then electrodes (2) and (4) are operated alternatively, and the cell flowed to the right, whereas if a blood cell was detected by IPM, it continued to the left part of the DEP microfluidic module. FIGS. 8a-8d show a label-free sorting of an SW480 cancer cell. The large gray images show FOV, and the off-axis hologram acquired. The small window shows the real-time-processed OPD profile (ROI in FIG. 4a). The fluorescence imaging area is marked by a dashed circle. In particular, FIG. 8a shows a classification using the quantitative OPD reconstruction (colorized ROI, the color bar represents the OPD in μm). The automatic classification result is shown at the top. FIG. 8b shows a cell exiting ROI and continues flowing to the electrodes. FIG. 8c shows the fluorescence signal from the validation channel, confirming that this is a cancer cell. FIG. 8d shows that based on the label-free imaging decision only (not using the fluorescence signal), the cell continues to flow to the right side of the DEP microfluidic module, where all cancer cells are sorted. FIGS. 9a-9d show a label-free sorting of a monocyte. The large images show the FOV, and the off-axis hologram acquired. The small window shows the real-time-processed OPD profile (ROI in FIG. 4a). The fluorescence imaging area is marked by a circle. In particular, FIG. 9a shows classification using the quantitative OPD reconstruction (colorized ROI, the color bar represents the OPD in μm). It should be noted that that in FIG. 9b, a sorted cancer cell appears, which is hidden behind the electrode (2) in the previous frame (FIG. 9a). The automatic classification result is shown at the top. FIG. 9b shows the cell in the ROI that continues flowing to the electrodes, along with a cancer cell (top right), which has already been sorted a few frames earlier. FIG. 9c shows no fluorescence signal in the validation channel, confirming that this is not a cancer cell. FIG. 9d shows that based on the label-free imaging decision only (not using the fluorescence signal), the cell continues to flow to the left side of the dielectrophoretic microfluidic module since it is not a cancer cell. For the measured cells, a classification sensitivity, specificity and accuracy of 97.8%, 98.9%, and 99.6% were achieved. After classification, sorting coinciding values were 72.7%, 60.8%, 69.2%, with false-positive (how many blood cells were sorted as cancer) of 12%, and the false-negative (how many cancer cells were sorted as blood cells) of 19%. The throughput got with the loss of cells and settings mentioned was less than 1 cell sec$^{-1}$. A label-free classification was thus shown with an accuracy as high as 98.9% for cancer cells from blood cells by using the teachings of the present invention. The classifier of the present invention is also able to classify correctly other types of epithelial cancer cells because of their size and nucleus shape and location in comparison to blood cells.

The use of OPD for the classifier yields 12 more powerful discriminating features to those of brightfield. Although CTCs are usually larger than PBMC and erythrocytes and brightfield images would suffice, for comparison to granulocytes, the OPD based features have a higher impact on the discrimination. SVM classification based on the OPD maps can be used to discriminate between healthy and cancer cells. In addition, the full OPD image of the cell gives the option to the clinician with other quantitative parameters on the cell, such as its dry mass and phase volume [11]. These data have proven itself useful for detecting abnormalities or introducing more complex analysis methods such as cell tomography [8]. The holographic imaging module is able to produce off-axis holographic videos of up to 15 frames sec$^{-1}$. Since one cell per frame is needed, with a flow rate of just a few μl hr$^{-1}$, a throughput of 15 cells sec$^{-1}$ may be obtained.

Preliminary purification of the blood based on the size of the cells may be first performed. This preliminary process takes only three minutes and from 1 ml of blood it leaves 1-10 CTC in 11,000 white blood cells. Then, the holographic classification method of the present invention further purifies the sample and detect the single cancer cells based on the OPD profiles. Since the processing rate of the sorting system of the present invention is about 15 cells per second, processing the entire pre-enriched sample may take about 12 minutes, and thus the entire processing of 1 ml of blood, including the pre-enrichment process, may take about 15 min. The framerate is mainly affected form the algorithm running time, but the total throughput is also a function of the maximum cell velocity the DEP allows. With 15 cells sec$^{-1}$, flow rates up to 180 μl hr$^{-1}$ with 300 cells μl$^{-1}$ may be used, but for the electrode to affect the direction of the cells in the mentioned setup, flow rates lower than 10 μl hr$^{-1}$ should be used. From Table 2 above, it can be seen that a blind sorting (i.e., without live video) can increase the framerate dramatically. Together with a DEP microfluidic module with a larger ROI and a dedicated set of electrodes, a much higher flow rate and higher cell concentration may be obtained to achieve higher throughput.

Figures 10A, 10B:
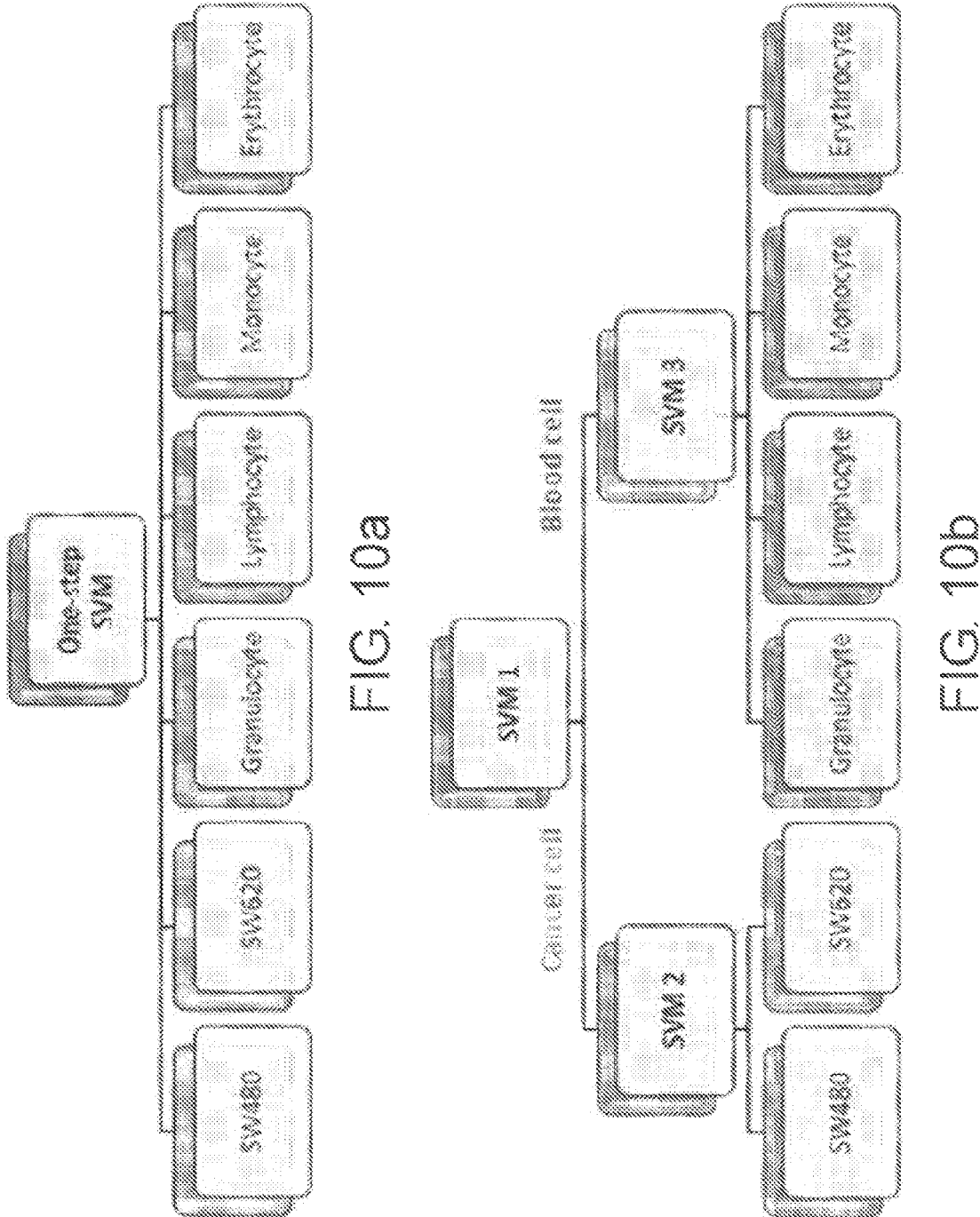
FIGS. 10a-10b are block diagram schemes of two types of classification processes one step and two-step SVM classifiers.

The classifier has been built using SVM, which is a common machine-learning classification algorithm that is based on features extraction. The goal of the SVM algorithm is to find a hyperplane in the features space that distinctly classifies the data points [26]. As shown in FIGS. 10a-10b, two types of SVM classifiers were built and their performance were compared. FIGS. 10a-10b are block diagram schemes of two types of classification processes. FIG. 10a shows a one-step SVM classifier while FIG. 10b shows a two-step SVM classifier. The first classifier is a simple multi-class SVM that classifies all six types of cells in parallel, which is referred as 'one-step SVM'. The second classifier is combined of three sub-classifiers: (1) SVM 1: classifying between cancer and blood cell; (2) SVM 2: classifying between two types of cancer cells; and (3) SVM 3: classifying between four types of blood cells. The second classifier is referred as 'two-step SVM', because its classification process is carried out in two stages: SVM 1 receives the OPD map of the cell and categorizes it in a general manner as 'cancer' or 'blood' cell. Afterward, a more specific classification is performed by SVMs 2 and 3, which receive their inputs according to SVM 1 result. All models were trained and tested on 80% and 20% of the dataset, respectively. The training was done using the 10-fold cross-validation procedure.

The holographic imaging module 320 of FIG. 3b was used to quantitatively image all six cell types during flow in a throughput of 15 cells per second, their OPD maps were acquired and classified in real-time, using a standard personal-computer CPU on a MATLAB platform. The experiments work was divided into two main parts: first, homogeneous samples of each cell type were flowed to create a supervised dataset for training and testing the models; second, different heterogeneous samples, containing several cell types together, were flowed to validate the classifier performance in real-time.

Figure 11A:
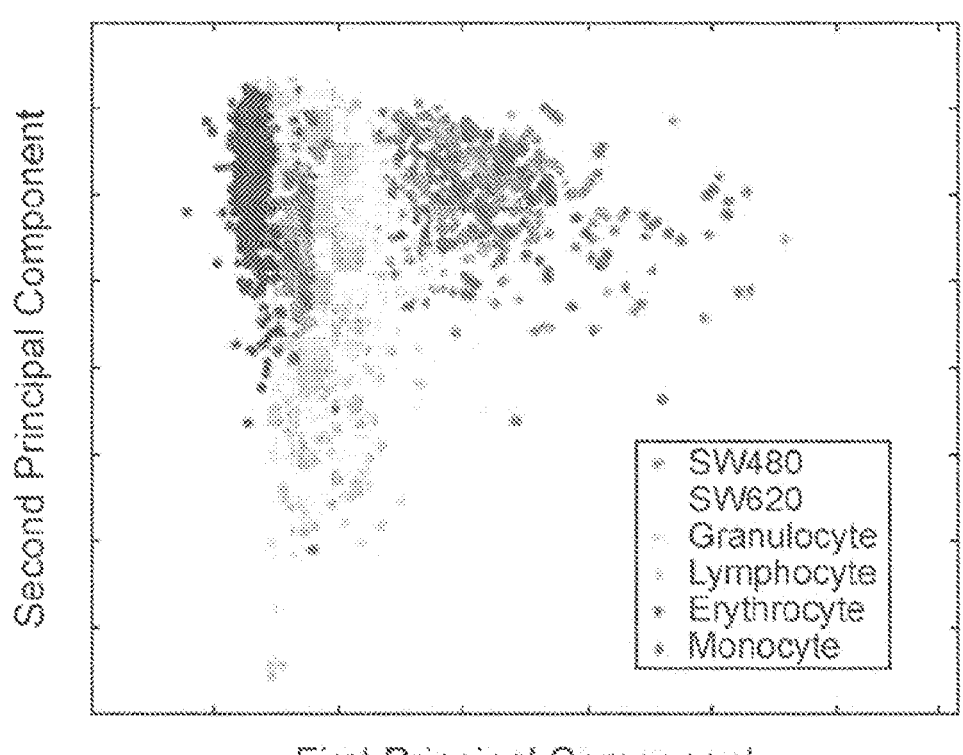
FIGS. 11a-11d show scatter spot in the 2D PCA space for all four classifiers.
Figure 11B:
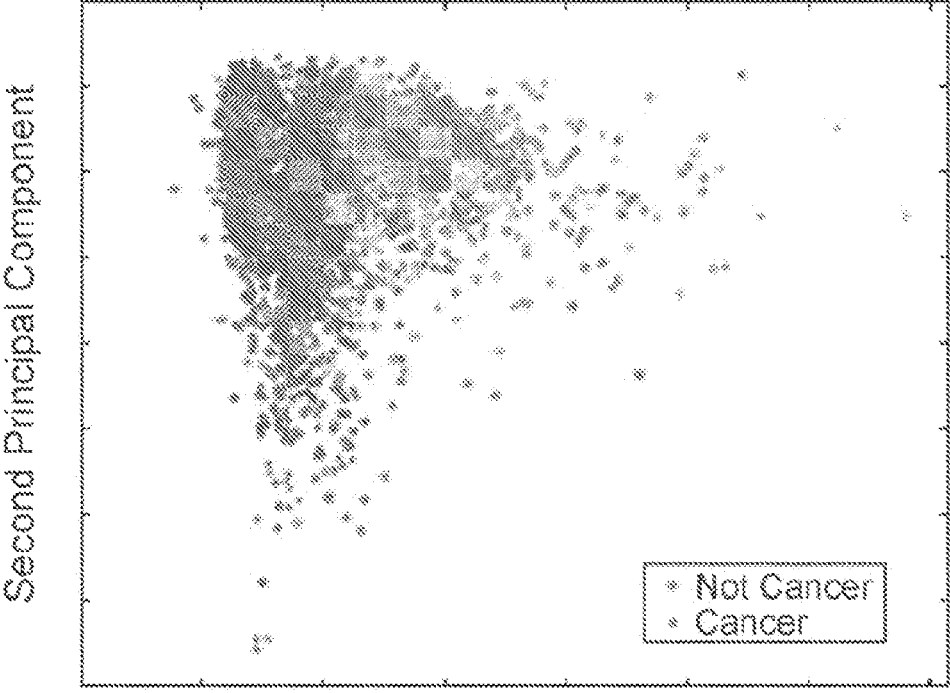
Figure 11C:
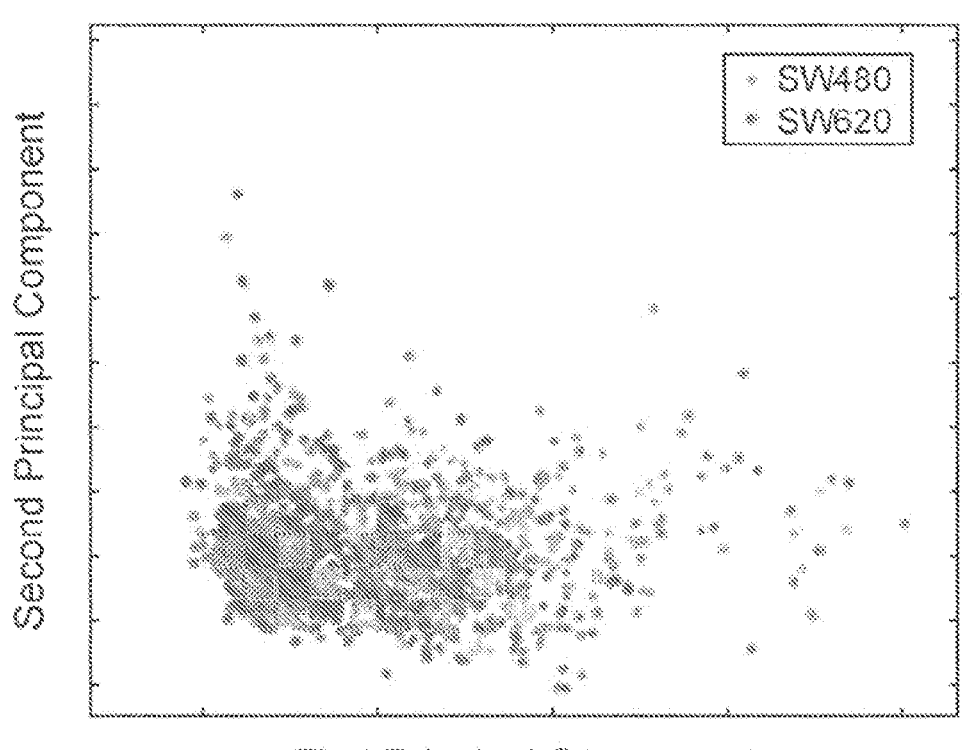
Figure 11D:
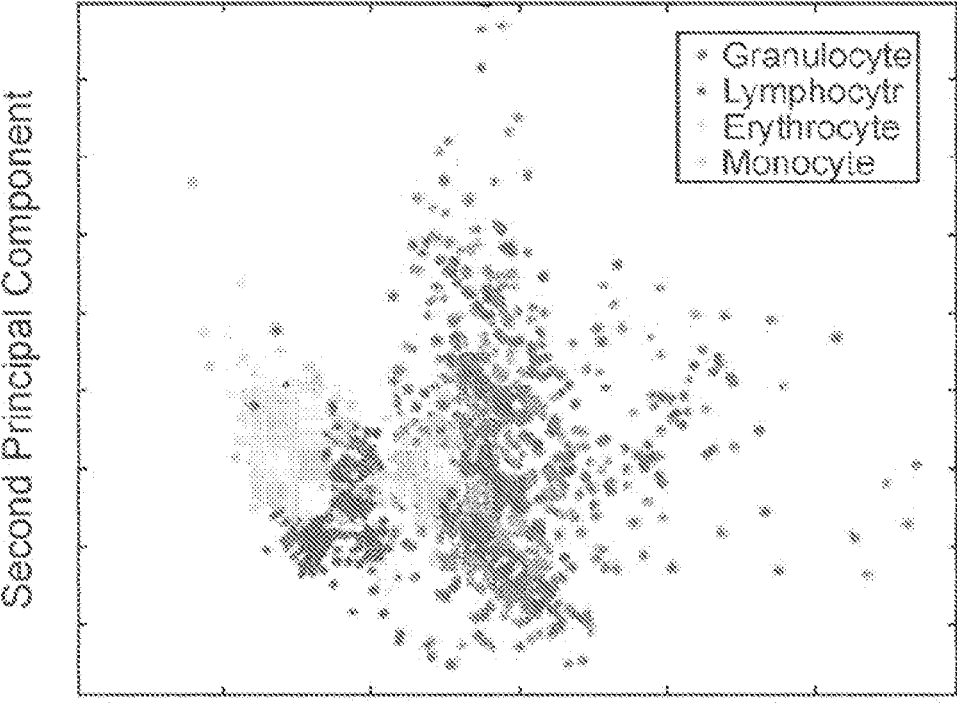

Prior to the analysis of the OPD maps, the segmentation image-processing procedure was applied to track the cell area during flow. Next, the twenty features, mentioned in Table 1, were extracted from the cell OPD area selected by the segmentation process. During the training process, the twenty hand-crafted features were used as an input for PCA analysis in order to extract the best combinations of these features, which were the most useful for classification between various cell types. The best classification results were obtained for the eight, six, ten and thirteen first principal components for SVM 1, SVM 2, SVM 3 and one-step SVM, respectively. FIGS. 11a-11d demonstrate the separation in the 2D PCA space for all four SVM models. The x and y axes represent the two first principal components, which have most of the variance of the data. In practice, the separation between the cell types was even better than shown in this illustration, since more than two principal components were practically used for classification, as elaborated above. The new highly discriminative features provided by PCA were then used as an input for the SVM models. FIGS. 11a-11d show scatter spot in the 2D PCA space for all four classifiers, where the x and y axes represent the two first principal components. In particular, FIG. 11a shows one-step SVM, FIG. 11b shows SVM 1, FIG. 11c shows SVM 2, FIG. 11d shows SVM 3. It should be noted that the actual separations between the groups are even better than presented, since only the first two principal components are used in this illustration, but the actual classifications have used more principal components.

For comparison, all SVM models were trained separately based the: (1) 2D morphological features; and (2) 2D morphological and 3D quantitative features together. Table 3 below presents the accuracies of these two assays for all SVM models. More specifically, Table 3 below presents accuracy results when using the 2D features and the 3D features for all SVM models. The improvement obtained for each classification method when also using the 3D features in comparison to be using the 2D features only is indicated in bold. As can be seen, the accuracy is higher when considering both the 2D morphological features and the 3D quantitative features for all trained models, demonstrating the advantage of using quantitative phase images for classification rather than simple 2D imaging Table 4 below presents the precision of performing wrong and right classifications with all SVM models combined with PCA on the test set, considering both the 2D morphological features and the 3D quantitative features. Table 4 shows precision of wrong and right predictions for all SVM models on the test set. As seen in Table 3 and Table 4 below, the two-step classifier exhibits the best overall accuracy when examining it on the test set.

TABLE 3

| | Total accuracy | |
| Model | 2D morphological features | 2D morphological + 3D features |
|---|---|---|
| SVM 1 | 92.88% | 98.22% ↑ 5.34% |
| SVM 2 | 95.6% | 96.98% ↑ 1.38% |
| SVM 3 | 74.68% | 91.77% ↑ 17.09% |
| One-step SVM | 78.46% | 91.3% ↑ 12.84% |
| Two-step SVM | 77.6% | 92.56% ↑ 14.96% |

TABLE 4

| Model | Class | Right prediction | Wrong prediction |
|---|---|---|---|
| SVM 1 | Cancer | 97.3% | 2.7% |
| | Not Cancer | 99.1% | 0.9% |
| SVM 2 | SW480 | 97.5% | 2.5% |
| | SW620 | 96.3% | 3.7% |
| SVM 3 | Granulocyte | 90% | 10% |
| | Lymphocyte | 97.8% | 2.2% |
| | Erythrocyte | 91.2% | 8.8% |
| | Monocyte | 82.6% | 17.4% |
| One-step SVM | SW480 | 97.8% | 2.2% |
| | SW620 | 88.6% | 11.4% |
| | Granulocyte | 88.8% | 11.2% |
| | Lymphocyte | 98.6% | 1.4% |
| | Erythrocyte | 86.2% | 13.8% |
| | Monocyte | 82.6% | 17.4% |
| Two-step SVM | SW480 | 97.5% | 2.5% |
| | SW620 | 90.1% | 9.9% |
| | Granulocyte | 87.6% | 12.4% |
| | Lymphocyte | 97.8% | 2.2% |
| | Erythrocyte | 91.2% | 8.8% |
| | Monocyte | 82.6% | 17.4% |

Next, the performance of the one-step and the two-step classifiers were on different samples during flow.

Next, an even amount of SW480 and SW620 cells was mixed and made them flow in the channel. Table 5 below presents the classification results of a sample of containing a 1:1 mixture of flowing SW480 and SW620 cells of three classifiers: one-step SVM, two-step SVM and SVM 2. As expected, SVM 2 achieved the best results for classifying between the two cancer classes only.

TABLE 5

| Class | One-step SVM | Two-steps SVM | SVM 2 |
|---|---|---|---|
| SW480 | 42.21% | 46.5% | 50.26% |
| SW620 | 10.3% | 29% | 49.74% |
| Granulocyte | 46% | 21.75% | 0% |
| Lymphocyte | 1% | 2% | 0% |
| Erythrocyte | 0.5% | 0.5% | 0% |
| Monocyte | 0% | 0.25% | 0% |
| Total cancer cells | 52.5% | 75.5% | 100% |
| Total blood cells | 47.5% | 24.5% | 0% |

Next, a homogeneous sample of granulocytes was used and imaged during flow. Table 6 below shows the classification results of a homogeneous sample of flowing granulocytes of three classifiers: one-step SVM, two-step SVM and SVM 3. Unsurprisingly, SVM 3 achieved the best results, since it classified between blood cells only. Here as well, the two-step SVM achieved better results than the one-step SVM.

TABLE 6

| Class | One-step SVM | Two-steps SVM | SVM 3 |
|---|---|---|---|
| SW480 | 0.59% | 1.77% | 0% |
| SW620 | 4.12% | 1.64% | 0% |
| Granulocyte | 78.34% | 80.12% | 83.04% |
| Lymphocyte | 4.5% | 3.29% | 4.5% |
| Erythrocyte | 0.2% | 0.3% | 0.2% |
| Monocyte | 12.25% | 12.88% | 12.25% |
| Total cancer | 4.71% | 3.41% | 0% |
| Total blood | 95.29% | 96.59% | 100% |

The average processing times for each step in the algorithm were as follows: (1) 0.028 sec for the reconstruction of the unwrapped phase profile, (2) 0.025 sec for cell segmentation and features extraction, (3) 0.01 sec and 0.095 sec for cell classification by the two-step SVM and the one-step SVM, respectively. Although the two-step classifier included two SVM models, while the one-step classifier included only one, the two-step SVM exhibited faster execution time. Combining all, the total processing times for each off-axis hologram containing 1 megapixel is 0.063 sec and 0.148 sec for the two-step SVM and the one-step SVM, respectively.

These results demonstrate the ability of the presented automatic algorithm to classify cancer in different cancer stages and white blood cells using flow-cytometry combined with machine learning, using OPD-map-based features. High classification rates for stain-free cells were obtained during real-time flow. The accuracy values and prediction precisions correspond with the separation between the groups presented in the 2D PCA space (see FIGS. 11a-11d, Tables 3-4), where the two-step SVM classifier manifested better classification results than the one-step classifier.

The invention claimed is:

1. A method for use in classification and sorting of certain type of cells in body fluids comprising:
   performing a holographic imaging of a heterogeneous population of cells during a flow of said cells and obtaining image data indicative of single-cell holograms of said cells, to enable label-free quantitative imaging of the flow of cells;
   automatically processing said image data to identify a certain type of cells during the flow, said automatically processing comprising:
   reconstructing optical path delay (OPD) maps from said image data, for each cell individually;
   automatically processing said OPD maps and identifying a certain type of cells, said automatically processing utilizing a trained classifier performing real-time machine learning classification to extract, from each OPD map, a plurality of 2D and 3D morphological and quantitative features of the heterogeneous population of cells, thereby identifying the certain type of cells within said heterogenous population of cells; and
   activating automatic sorting of the certain type of cells during said flow of the cells, thereby obtaining a real-time, automatic, label-free holography-activated sorting of the cells.

2. The method of claim 1, wherein said performing the holographic imaging of a heterogeneous population of cells during the flow of said cells comprises quantitative phase microscopy to obtain a plurality of off-axis holograms and measure the quantitative phase profile of the cell being indicative of the optical path delay (OPD) profile of the cell.

3. The method of claim 1, wherein automatically processing the image data comprises performing classification of unlabeled cancer cells in blood to enable label-free imaging and sorting of cancer cells in blood.

4. The method of claim 3, wherein the automatically processing the image data comprises performing a sequence of classification, wherein each classification is capable of identifying different types of cells.

5. The method of claim 3, further comprising automatically classifying primary and metastatic cancer cells.

6. The method of claim 1, wherein the automatically sorting the certain type of cells comprises at least one of (i) isolating at least one certain type of cells from other cells in the flow; or (ii) automatically sorting the certain type of cells during or following cell visualization.

7. The method of claim 1, further comprising at least one of (i) counting cells; or (ii) identifying in the certain type of cells at least one of DNA, RNA, protein or any other metabolite to provide a genetic metabolic profile of a patient.

8. The method of claim 7, further comprising analyzing the genetic metabolic profile to enable at least one of a diagnosis or an optimization of a treatment of the patient.

9. A system for use in classification and sorting certain type of cells in body fluids, the system comprising:
   a holographic imaging module being configured and operable to image a flow of heterogeneous population of cells and provide image data indicative of single-cell holograms of said cells;
   a cell sorting module being configured as a microfluidic module and operable to sort the flow of cells; and
   a control unit being configured and operable to receive from said holographic imaging module the image data being indicative of the single-cell holograms of said cells single-cell holograms of said cells during flow thereof and automatically process the image data and identify a certain type of cells during the flow; and upon identification of a certain type of cells activating said cell sorting module, to thereby enable real-time, automatic, label-free holography-activated sorting of the cells;

wherein said control unit is configured and operable to perform said automatic processing of the image data as follows:

reconstructing optical path delay (OPD) maps from said image data, for each cell individually;

automatically processing said OPD maps and identifying a certain type of cells, said automatically processing utilizing a trained classifier performing real-time machine learning classification to extract, from each OPD map, a plurality of 2D and 3D morphological and quantitative features of the heterogeneous population of cells, thereby identifying the certain type of cells within said heterogenous population of cells; and activating automatic sorting of the certain type of cells during said flow of the cells, thereby obtaining a real-time, automatic, label-free holography-activated sorting of the cells.

10. The system of claim 9, wherein said cell sorting module is placed inside the holographic imaging module such that the cell sorting module is viewed through the holographic imaging module.

11. The system of claim 9, wherein said cell sorting module comprises a dielectrophoretic microfluidic module comprises an array of spaced-apart electrodes, and being operable to be responsive to data provided by the classifier to operate at least one electrode by alternatively switching in on or off to direct the cells of interest.

12. The system of claim 11, wherein said array of spaced-apart electrodes are positioned on both sides of the dielectrophoretic microfluidic module to define a sorting trajectory for the flow of cells along the dielectrophoretic microfluidic module.

13. The system of claim 11, wherein at least one electrode of said plurality of electrodes is configured and operable to at least one of the following: center and direct the cells along the sorting trajectory into an imaging field of view and a holographic region of interest, push the cells to either side of the dielectrophoretic microfluidic module, increase the distance between cell streams.

14. The system of claim 9, wherein said holographic imaging module comprises a high- or low-coherence off-axis interferometric phase microscope configured and operable to quantitatively image cells during flow.

15. The system of claim 9, further comprising at least one (i) at least one container for collecting sorted-out cells; or (ii) a plurality of microfluidics pumps.

16. The system of claim 15, wherein at least one microfluidics pump of said plurality of microfluidics pumps is configured and operable to direct the sorted-out cells towards said at least one container.

17. A method comprising:

performing a holographic imaging of a flow of a heterogeneous population of cells to enable label-free quantitative imaging of the flow of cells, wherein said performing the holographic imaging comprises at least one of the following:

(i) performing a digital holographic microscopy and quantitative phase microscopy to measure the quantitative phase profile of the cell being indicative of the optical path delay (OPD) profile of the cell to enable label-free interferometric phase microscopy; or (ii) obtaining a plurality of off-axis holograms and performing a quantitative phase reconstruction process;

automatically processing image data of the holographic imaging to identify a certain type of cells during the flow, wherein:

said automatically processing the image data comprises at least one of the following: (a) reconstructing the OPD map for each cell individually; or (b) extracting from each OPD 2D and 3D morphological and quantitative features; and said automatically processing the image data comprises performing classification based on 2D and 3D morphological quantitative features of the cells during the cell flow, by carrying out at least one of the following: performing a real-time classification of each cell; or performing classification of unlabeled cancer cells in blood to enable label-free imaging and sorting of cancer cells in blood; and further comprises automatically classifying primary and metastatic cancer cells; and automatically sorting the certain type of cells during flow, thereby obtaining a real-time, automatic, label-free holography-activated sorting of the cells.

* * * * *